US012646149B2

(12) United States Patent
Vasconcelos

(10) Patent No.: US 12,646,149 B2
(45) Date of Patent: Jun. 2, 2026

(54) DENOISING NEURAL NETWORKS WITH SHARED CORE SUB-NETWORKS

(71) Applicant: GDM Holding LLC, Mountain View, CA (US)

(72) Inventor: Cristina Nader Vasconcelos, Montreal (CA)

(73) Assignee: GDM Holding LLC, Mountain View, CA (US)

( * ) Notice: Subject to any disclaimer, the term of this patent is extended or adjusted under 35 U.S.C. 154(b) by 0 days.

(21) Appl. No.: 19/190,426

(22) Filed: Apr. 25, 2025

(65) Prior Publication Data

US 2025/0336043 A1     Oct. 30, 2025

Related U.S. Application Data

(60) Provisional application No. 63/638,870, filed on Apr. 25, 2024.

(51) Int. Cl.
G06T 5/60          (2024.01)
G06T 3/4053        (2024.01)
          (Continued)

(52) U.S. Cl.
CPC .............. G06T 5/60 (2024.01); G06T 3/4053 (2013.01); G06T 5/70 (2024.01);
          (Continued)

(58) Field of Classification Search
None
See application file for complete search history.

(56) References Cited

U.S. PATENT DOCUMENTS

2024/0135509 A1*     4/2024   Liu ............................ G06T 5/77
2024/0169488 A1*     5/2024   Liu ............................ G06T 5/70
2024/0338799 A1*   10/2024   Li  ........................... G06F 40/126

FOREIGN PATENT DOCUMENTS

CN          113160084 B   *   7/2022   ............. G06N 3/045

OTHER PUBLICATIONS

Cho et al., "Davidsonian Scene Graph: Improving Reliability in Fine-grained Evaluation for Text-to-Image Generation," CoRR, Oct. 27, 2023, arXiv:2310.18235, 21 pages.
(Continued)

*Primary Examiner* — Jiangeng Sun
(74) *Attorney, Agent, or Firm* — Fish & Richardson P.C.

(57)          ABSTRACT

Methods, systems, and apparatuses, including computer programs encoded on computer storage media, for training a denoising neural network and, once the denoising neural network is trained, generating new images using the denoising neural network. In particular, the described techniques include obtaining data specifying a trained initial denoising neural network, obtaining training data, and training, using the training data and on a denoising objective, a target denoising neural network. The target denoising neural network includes the core-subnetwork of the trained initial denoising neural network, but also includes a target encoder and decoder neural networks that are not included in the trained initial denoising neural network. By training a target neural network that includes the core-subnetwork of a trained initial denoising neural network, the system achieves stable training of a large-scale target denoising neural networks that can be used to generate high resolution images.

30 Claims, 7 Drawing Sheets

(51) Int. Cl.

| | |
|---|---|
| *G06T 5/70* | (2024.01) |
| *G06V 10/72* | (2022.01) |
| *G06V 10/774* | (2022.01) |
| *G06V 10/82* | (2022.01) |

(52) U.S. Cl.
CPC .............. *G06T 2207/20081* (2013.01); *G06T 2207/20084* (2013.01); *G06T 2207/30168* (2013.01); *G06V 10/72* (2022.01); *G06V 10/774* (2022.01); *G06V 10/82* (2022.01)

(56) References Cited

OTHER PUBLICATIONS

Heek et al., "Multistep Consistency Models," CoRR, Mar. 11, 2024, arXiv:2403.06807, 16 pages.

Heusel et al., "GANs Trained by a Two Time-Scale Update Rule Converge to a Local Nash Equilibrium," CoRR, Jun. 26, 2017, arXiv:1706.08500, 38 pages.

Hoogeboom et al., "Simple diffusion: End-to-end diffusion for high resolution images," CoRR, Jan. 26, 2023, arxiv.org/abs/2301.11093, 20 pages.

Jayasumana et al., "Rethinking FID: Towards a Better Evaluation Metric for Image Generation," CoRR, Nov. 20, 2023, arXiv:2401.09603, 10 pages.

Oquab et al., "DINOv2: Learning Robust Visual Features without Supervision," CoRR, Apr. 14, 2023, arXiv:2304.07193, 32 pages.

Podell et al., "SDXL: Improving Latent Diffusion Models for High-Resolution Image Synthesis," CoRR, Jul. 4, 2023, arXiv:2307.01952, 21 pages.

Radford et al., "Learning Transferable Visual Models From Natural Language Supervision," CoRR, Feb. 26, 2021, arXiv:2103.00020, 48 pages.

Raffel et al., "Exploring the Limits of Transfer Learning with a Unified Text-to-Text Transformer," CoRR, Oct. 23, 2019, arXiv:1910.10683, 67 pages.

Stein et al., "Exposing flaws of generative model evaluation metrics and their unfair treatment of diffusion models," CoRR, Jun. 7, 2023, arXiv:2306.04675, 53 pages.

Xue et al., "ByT5: Towards a token-free future with pre-trained byte-to-byte models," CoRR, May 28, 2021, arXiv:2105.13626, 16 pages.

International Search Report and Written Opinion in International Appln. No. PCT/US2025/026434, mailed on Jul. 11, 2025, 16 pages.

Jiatao et al: "Matryoshka Diffusion Models," CoRR, Oct. 23, 2023, arxiv.org/abs/2310.15111, 30 pages.

Vasconcelos et al., "Greedy Growing Enables High-Resolution Pixel-Based Diffusion Models," CoRR, May 27, 2024, arxiv.org/abs/2405.16759, 29 pages.

Esser et al., "Scaling Rectified Flow Transformers for High-Resolution Image Synthesis," CoRR, submitted on Mar. 5, 2024, arxiv.org/pdf/2403.03206, 28 pages.

* cited by examiner

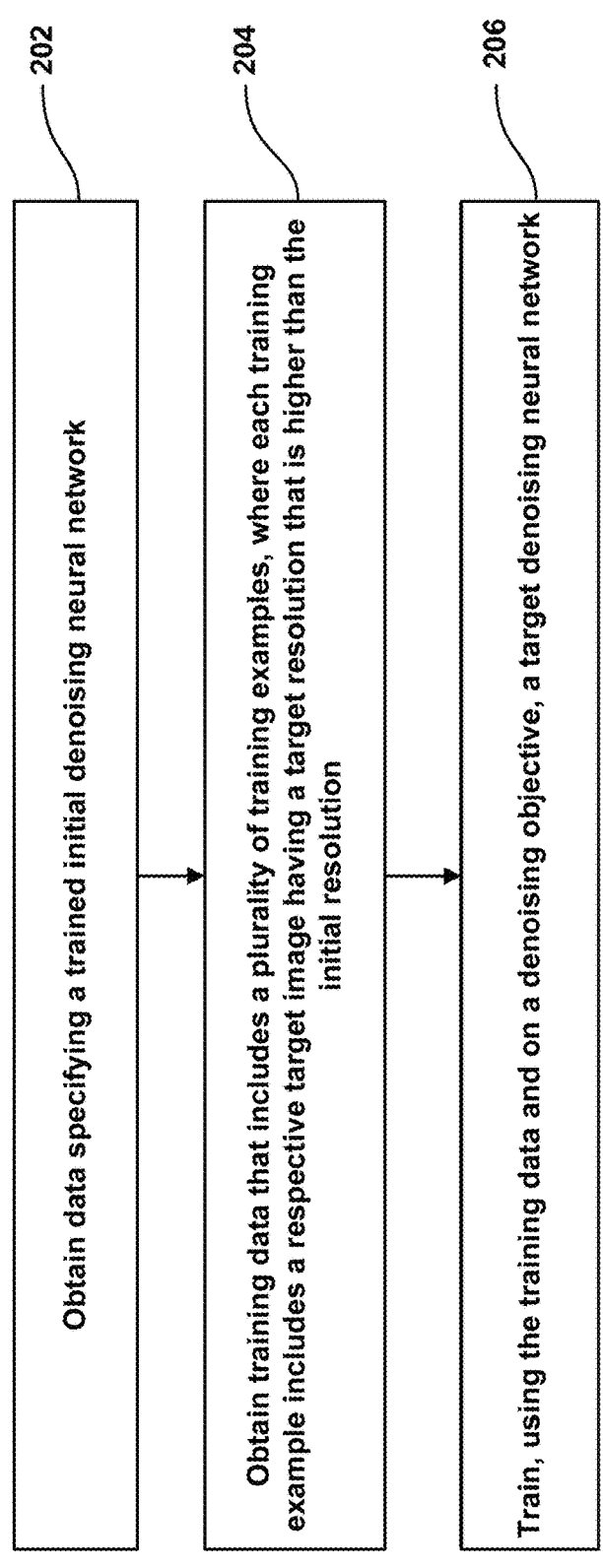

200

202 Obtain data specifying a trained initial denoising neural network

204 Obtain training data that includes a plurality of training examples, where each training example includes a respective target image having a target resolution that is higher than the initial resolution 206 Train, using the training data and on a denoising objective, a target denoising neural network

FIG. 2

302 — Obtain training data that includes training examples

304 — For each training example, combines noise with the target image

306 — For each training example, generate a target denoising output

308 — Evaluate an objective using all training examples and respective target denoising outputs 310 — Update trainable parameters to optimize the objective

300

400

| model | $FID_{30k}$ ↓ | $FD\text{-}Dino_{30k}$ ↓ | $CMMD_{30k}$ ↓ | $CLIP_{score}$ ↑ |
|---|---|---|---|---|
| $SDXL_{v1.0}$ | 13.19 | 185.57 | 0.898 | 0.279 |
| Vermeer | | | | |
| raw model | 16.26 | 185.25 | 0.631 | 0.270 |
| + prompt engineering | 17.33 | 216.01 | 0.867 | 0.269 |
| + style tuning | 24.51 | 336.25 | 1.167 | 0.262 |
| distilled | 25.97 | 347.19 | 0.885 | 0.261 |

| model | DSG↑ | | | | DSG |
| | Entities | Relations | Attributes | Global | |
|---|---|---|---|---|---|
| SD2.1 | 75.44 | 53.06 | 69.66 | 68.49 | 71.23 |
| Muse. | 77.65 | 60.64 | 75.61 | 67.18 | 73.09 |
| Imagen Cascade | 79.94 | 62.73 | 75.73 | 69.34 | 75.93 |
| SDXL$_{v1.0}$ | 88.04 | 73.00 | 78.48 | 75.19 | 81.47 |
| Vermeer    *raw model* | 86.92 | 76.36 | 76.48 | 68.49 | 80.77 |
| *+promp eng* | 87.94 | 74.92 | 76.31 | 67.41 | 80.99 |
| *+style tunning* | 88.04 | 74.21 | 77.38 | 69.57 | 81.16 |
| *+distillation.* | 84.71 | 69.23 | 72.68 | 65.49 | 76.88 |

DENOISING NEURAL NETWORKS WITH SHARED CORE SUB-NETWORKS

BACKGROUND

This specification relates to generating images using machine learning models.

As one example, neural networks are machine learning models that employ one or more layers of nonlinear units to predict an output for a received input. Some neural networks include one or more hidden layers in addition to an output layer. The output of each hidden layer is used as input to another layer in the network, e.g., the next hidden layer or the output layer. Each layer of the network generates an output from a received input in accordance with current values of a respective set of weights.

SUMMARY

This specification describes a system implemented as computer programs on one or more computers in one or more locations that trains a denoising neural network for use in generating images. Once trained, the system can use the denoising neural network to generate new images, e.g., conditioned on a conditioning input, e.g., one or more encodings of a text sequence, another image, a class label, and so on.

Particular embodiments of the subject matter described in this specification can be implemented so as to realize one or more of the following advantages.

Training a denoising neural network for use in generating new high-resolution images that accurately aligns with a given conditioning input is a challenging task. It is a particularly difficult task when the training of the denoising neural network needs to optimize both the aesthetic quality of new images and compute time of generating a new image.

Some challenges include training instabilities of the denoising neural network that arise when growing the denoising neural network size and/or target image resolution, high training computational resource requirements (both in terms of memory and computation), and the requirement of a large amount of high resolution training images.

To ameliorate these issues, techniques have been developed, such as those that require the use of cascaded models (i.e., a sequence of diffusion models each targeting a progressively higher resolution and trained independently), and techniques that rely on latent diffusion models, where image generation is initially performed in a low-dimensional latent representation and from which high resolution images are later generated via a pre-trained latent decoder.

But these other techniques are not themselves without drawbacks. In particular, both these techniques (the use of cascade models and latent diffusion models) require disjoint and independent training of neural networks without shared components which is computationally costly and complex, and potentially introduces additional approximation errors relative to training a single neural network.

For example, when designing a cascaded model, it is challenging to identify potential sources of quality degradation and distortion within generated new images from design decisions among the many neural networks included in a cascaded model. As a particular example, one well known issue of cascaded models is the distribution shift between training and inference, where inputs to super-resolution or decoder neural networks during training are obtained by down-sampling or encoding training images, but during inference they are generated from other neural networks, and hence may deviate from the training distribution. This deviation can cause amplification of unnatural distortions produced by neural networks early in the cascade.

Similar to the previous example of cascade systems, techniques that use latent diffusion models require training multiple neural networks without shared components independently. For example, the latent diffusion model is independently trained from and does not share any components with a super resolution/latent decoder neural network, but both are necessary to generate high-resolution images, which introduces additional cost, complexity, and the potential for errors relative to training a single neural network.

This specification describes a system that can address the aforementioned challenges. That is, this specification describes techniques that include obtaining data specifying a trained initial denoising neural network configured to receive an initial denoising input that includes a noisy initial image (e.g., pixel data) which has an initial resolution and configured to process the initial denoising input to generate an initial denoising output that defines an estimate of a noise component of the noisy initial image. The initial denoising neural network includes: (i) an initial encoder sub-network configured to map the noisy initial image to an initial representation of the noisy initial image having a core resolution; (ii) a core sub-network that is configured to process the initial representation having the core resolution to generate an updated representation having the core resolution; and (iii) an initial decoder sub-network configured to map the updated representation having the core resolution to the initial denoising output. After obtaining the data specifying a trained initial denoising neural network, the techniques also include obtaining training data which includes a plurality of training examples, and each training example includes a respective target image which has a target resolution that is higher than the initial resolution. Then the techniques also include training, using the training data and on a denoising objective, a target denoising neural network. The target denoising neural network is configured to receive a target denoising input that includes a noisy target image that has the target resolution and to process the target denoising input to generate a target denoising output that defines an estimate of a noise component of the noisy target image. Furthermore, the target denoising neural network includes: (i) a target encoder sub-network configured to map the noisy target image to an initial representation of the noisy target image having the core resolution; (ii) the core sub-network; and (iii) a target decoder sub-network configured to map an updated representation of the noisy target image having the core resolution and generated by the core-subnetwork to the target denoising output. The updated representation may therefore be considered to provide an initial estimate of the target denoising output.

As a result of training the target denoising neural network that includes and depends on the core sub-network of the already trained initial denoising neural network (i.e., a shared component), the described techniques have the advantage of being able to train a single large-scale, non-cascaded pixel-based model targeting high resolution image generation (i.e., the target denoising neural network). In other words, the separate but not independent training of the components of the target denoising neural network allows for training of a denoising neural network that can be used to generate high-resolution images that also exhibits high conditioning-input-to-image alignment. This is because the core sub-network of the initial denoising neural network has already learned conditioning-input-to-image alignment, i.e., generates denoising outputs using a conditioning input (e.g., embeddings of a text sequence) while the target denoising neural network encoder decoder sub-networks learn the high-resolution generation.

Additionally, the described techniques have the advantage of being able to stably train the denoising neural network with data that includes multiple resolutions (i.e., the target encoder decoder sub-networks train using a target resolution while the core sub-network trains using images of both an initial resolution (previously with the already trained initial denoising neural network) and the target resolution using the target denoising neural network, mitigating the challenges that scarce availability of high-resolution images can pose.

Furthermore, the described techniques have the advantage of being able to improve the aesthetic value of generated images by further training the denoising neural network on a curated subset of training images.

Also, the described techniques can be used to distill the denoising neural network to accelerate the generation of images. For example, the trained target denoising neural network can be used to train a consistency neural network that mimics the denoising outputs of the target denoising neural network.

A n example of the performance of the described techniques includes a human preference study that demonstrates that images generated using the described techniques are preferred by users over those generated by state-of-the-art techniques at a rate of two to one.

As another example of the performance of the described techniques, the described techniques can faithfully train a single denoising neural network for use in generating high resolution images 2× to 8× higher than state-of-the-art techniques can, with excellent alignment with text prompts (i.e., condition inputs), and much smaller training batches.

The details of one or more embodiments of the subject matter of this specification are set forth in the accompanying drawings and the description below.

According to a first aspect there is provided a method performed by one or more computers. The method includes obtaining data specifying a trained initial denoising neural network that is configured to receive an initial denoising input that includes a noisy initial image that has an initial resolution and to process the initial denoising input to generate an initial denoising output that defines an estimate of a noise component of the noisy initial image. The initial denoising neural network includes: (i) an initial encoder sub-network configured to map the noisy initial image to an initial representation of the noisy initial image having a core resolution; (ii) a core sub-network that is configured to process the initial representation having the core resolution to generate an updated representation having the core resolution; and (iii) an initial decoder sub-network configured to map the updated representation having the core resolution to the initial denoising output. After obtaining the data specifying a trained initial denoising neural network, the method includes obtaining training data which includes a plurality of training examples, and each training example includes a respective target image which has a target resolution that is higher than the initial resolution. Then the method lastly includes training, using the training data and on a denoising objective, a target denoising neural network. The target denoising neural network is configured to receive a target denoising input that includes a noisy target image that has the target resolution and to process the target denoising input to generate a target denoising output that defines an estimate of a noise component of the noisy target image. Furthermore, the target denoising neural network includes: (i) a target encoder sub-network configured to map the noisy target image to an initial representation of the noisy target image having the core resolution; (ii) the core sub-network; and (iii) a target decoder sub-network configured to map an updated representation of the noisy target image having the core resolution and generated by the core-subnetwork to the target denoising output.

In some cases, the core resolution is smaller than the initial and target resolutions.

In some implementations, training the target denoising neural network includes training the target encoder sub-network and the target decoder sub-network while holding parameters of the core sub-network fixed to corresponding values in the initial denoising neural network.

In some cases, the core sub-network includes a plurality of self-attention layers.

In some cases, the initial denoising input and the target denoising input each include respective conditioning inputs, and each training example further includes a respective training conditioning input that characterizes one or more properties of the respective target image in the training example.

Further in some cases, the core sub-network includes one or more conditioning layers that each update an input representation to the conditioning layer conditioned on at least a representation of a corresponding conditioning input.

In some cases, the one or more conditioning layers are cross-attention layers.

In some cases, the respective conditioning input includes a respective encoded representation of each of one or more context inputs that includes one or more embeddings.

In some cases, the initial denoising neural network and the target denoising neural network each include a context encoder neural network that is configured to process the respective encoded representations of each of the one or more context inputs to generate a representation of the conditioning input.

In some cases, training the target denoising neural network includes training the target encoder sub-network and the target decoder sub-network while holding parameters of the core sub-network and the context encoder neural network fixed to corresponding values in the initial denoising neural network.

Further in some cases, the context encoder neural network includes an attentional pooling sub-network followed by a multi-layer perceptron (MLP).

In some cases, the initial denoising input and the target denoising input each include respective time inputs specifying a time step that defines a noise level for a corresponding noisy image. Additionally, one or more of the conditioning layers are conditioned on a representation of a corresponding time input.

In some cases, the initial denoising neural network and the target denoising neural network each include a time encoder neural network that is configured to process the respective time input to generate a representation of the respective time input.

In some cases, training the target denoising neural network includes training the target encoder sub-network and the target decoder sub-network while updating parameters of the time encoder neural network starting from corresponding values in the initial denoising neural network.

In some cases, the initial encoder sub-network includes a downsampling convolutional sub-network configured to map the noisy initial image to a downsampled representation having the core resolution. The initial encoder sub-network also includes a convolutional encoder sub-network configured to map the downsampled representation to the initial representation of the noisy initial image having the core resolution.

In some cases, the initial decoder sub-network includes a convolutional decoder neural network configured to map the updated representation to a decoded representation having the core resolution and an upsampling convolutional sub-network configured to map the decoded representation having the core resolution to the initial denoising output.

In some cases, obtaining data specifying the trained initial denoising neural network includes training the initial denoising neural network using initial training data and on the denoising objective, and the initial training data includes a plurality of initial images having the initial resolution.

In some implementations, the method further includes after training the target denoising neural network, performing a reverse diffusion process using the target denoising neural network to generate a new image having the target resolution.

In some cases, performing a reverse diffusion process using the target denoising neural network to generate a new image having the target resolution includes performing the reverse diffusion process conditioned on a new conditioning input.

According to a second aspect there is provided a method performed by one or more computers. The method includes receiving a conditioning input. Then, initializing a representation of a new image by sampling noise values from a noise distribution. Then, updating the representation of the new image at each of a plurality of reverse diffusion steps. The updating includes, at each reverse diffusion step processing a denoising input for the reverse diffusion step that includes the representation of the new image using a denoising neural network conditioned on the conditioning input to generate a denoising output that defines an estimate of a noise component of the representation of the new image. The denoising neural network is the target denoising neural network of any methods of the first aspect. After updating the representation of the new images at each of a plurality of reverse diffusion steps, the method includes updating the representation of the new image using the denoising output. Then lastly, after updating the representation of the new image at each of the plurality of reverse diffusion steps, generating the new image from the representation of the new image.

Further in some cases of the second aspect, the conditioning input includes a text sequence, and the method further includes processing the text sequence using each of a plurality of text encoder neural networks to generate a respective encoded representation of the text sequence for each of the text encoder neural networks. Then, combining the respective encoded representation of the text sequence for each of the text encoder neural networks to generate a combined encoded representation, where the denoising input for each reverse diffusion step includes the combined encoded representation.

Further in some cases of the second aspect, combining the respective encoded representation of the text sequence for each of the text encoder neural networks to generate a combined encoded representation includes concatenating the respective encoded representation of the text sequence for each of the text encoder neural networks to generate a concatenated encoded representation. Then, processing the concatenated encoded representation using a context encoder neural network to generate the combined encoded representation.

In some cases of the second aspect, the plurality of text encoder neural networks have been trained independently of one another.

In some cases of the second aspect, the denoising neural network has been trained on first training data that includes a plurality of first training images on a denoising objective.

Further in some cases of the second aspect, after being trained on the first training data, the denoising neural network has been further trained on second training data that is generated from a mixed set of images that includes the first training images and a plurality of second training images that have been classified as aesthetic images.

Further in some cases of the second aspect, the second training images are a proper subset of the training images that have been classified as conforming to aesthetic and compositional attributes by an image classification neural network.

Further in some cases of the second aspect, after being further trained on the second training data, the denoising neural network has been further trained on third training data on a consistency distillation objective.

In some implementations of the second aspect, generating the new image includes outputting, as the new image, the representation of the new image after being updated at each of the plurality of reverse diffusion steps.

According to a third aspect, there is provided the methods of the first aspect or second aspect performed by a system comprising one or more computers and one or more storage devices storing instructions that are operable, when executed by the one or more computers, to cause the one or more computers to perform the operations of the respective method.

According to a fourth aspect, there is provided the methods of the first aspect or second aspect performed by one or more computer storage media encoded with instructions that, when executed by one or more computers, cause the one or more computers to perform the operations of the respective method.

Other features, aspects, and advantages of the subject matter will become apparent from the description, the drawings, and the claims.

BRIEF DESCRIPTION OF THE DRAWINGS

FIG. 2 is a flow diagram of an example process for training a target denoising neural network.

FIG. 5 is an example of the performance of the described techniques.

FIG. 6 is an example of the performance of the described techniques.

DETAILED DESCRIPTION

Figure 1:
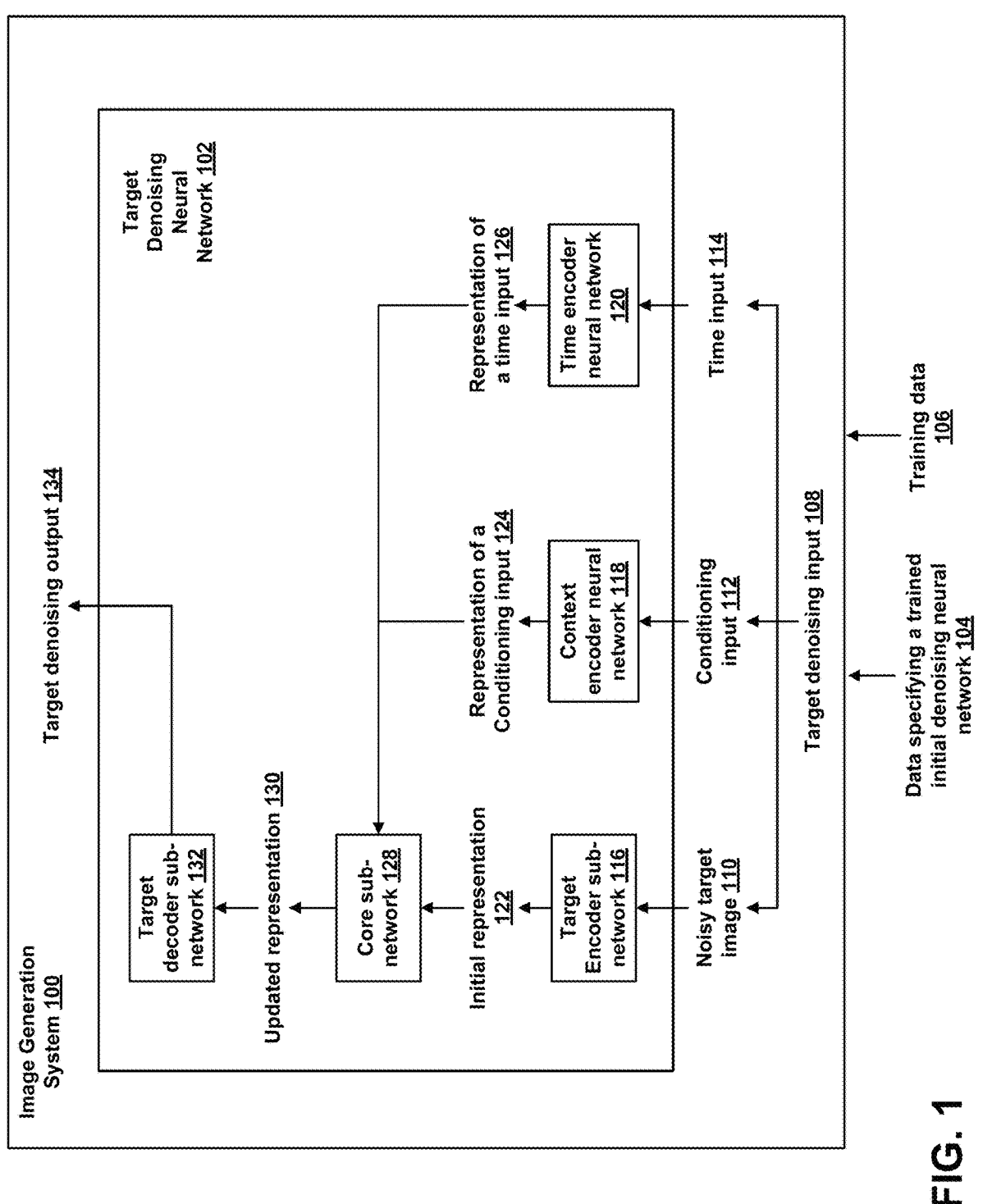
FIG. 1 shows an image generation system.

FIG. 1 shows an example image generation system 100. The system 100 is an example of a system implemented as computer programs on one or more computers in one or more locations, in which the systems, components, and techniques described below can be implemented.

The system 100 trains a target denoising neural network 102 using an already trained initial denoising neural network (i.e., data specifying a trained initial denoising neural network 104). In addition to generating new images, the trained target denoising neural network 102 may also be used in a number of other ways, such as removal of noise from an input image (the input image provided as a conditioning input to the trained target denoising neural network) or to effect some other improvement in the quality of the other image. As another example, another image may be processed to provide inpainting, Super-Resolution, Video Generation (e.g., generation of a sequence of video frames based on the input), or Image-to-Image Translation. The system may also be used for Temporal Data Modeling, e.g., prediction and modelling of temporal data based on an input.

The trained initial denoising neural network is configured to receive an initial denoising input that includes a noisy initial image having an initial resolution and to process the initial denoising input to generate an initial denoising output that defines an estimate of a noise component of the noisy initial image.

The initial denoising neural network includes (i) an initial encoder sub-network (not shown) configured to map the noisy initial image to an initial representation of the noisy initial image having a core resolution (i.e., the resolution the core sub-network is configured to process); (ii) a core sub-network 128 that is configured to process the initial representation having the core resolution to generate an updated representation having the core resolution; and (iii) an initial decoder sub-network (not shown) configured to map the updated representation having the core resolution to the initial denoising output.

Thus, the initial denoising neural network can be used to generate images having the initial resolution. That is, using an appropriate algorithm (e.g., any appropriate diffusion sampler for a reverse diffusion process), the initial denoising neural network can be used to generate images having the initial resolution.

In some cases, the initial denoising neural network is one that the system 100 (or another system) has trained on a denoising objective using initial training data that includes a plurality of initial images having the initial resolution.

For example, the initial images may be derived using one or more cameras and/or other passive or active image sensors. As one example, the images may be medical images derived using medical sensors. Where the images are medical images, the trained target denoising neural network may be used in a medical process, such as to process MRI data in order to generate images that clearly show medically relevant information, such as tumor location.

The denoising objective on which the system 100 trains the initial denoising neural network using can be any of a variety of appropriate objectives such as a mean squared error objective (to minimize the difference between predicted estimate of a noise component of the noisy initial image and the true noise component), or score matching objective (to estimate the score function (defined as the gradient of the log density) of the perturbed data distribution at different noise levels).

The target denoising neural network 102, however, may be required to generate images having a target resolution that is higher than the initial resolution. To that end, the system 100 leverages the core sub-network 128 of the initial neural network in order to initialize the target neural network 102 while still having the target denoising neural network 102 generate target resolution images.

In particular, the target denoising neural network 102 is configured to receive a target denoising input 108 that includes a noisy target image 110 having the target resolution and to process the target denoising input 108 to generate a target denoising output 134 that defines an estimate of a noise component of the noisy target image 110.

So that the core sub-network 128 can be shared between the initial and target denoising neural networks 102, the target denoising neural network 102 includes: (i) a target encoder sub-network 116 configured to map the noisy target image 110 to an initial representation of the noisy target image 122 having the core resolution; (ii) the core sub-network 128; and (iii) a target decoder sub-network 132 configured to map an updated representation of the noisy target image 130 having the core resolution and generated by the core-subnetwork 128 to the target denoising output 134.

The system 100 then obtains training data 106 that includes a plurality of training examples, where each training example includes a respective target image having a target resolution that is higher than the initial resolution. The system then trains, using the training data 106 and on a denoising objective, the target denoising neural network 102.

In some implementations, during this training, the system 100 can train the target encoder sub-network 116 and the target decoder sub-network 132 while holding parameters of the core sub-network 128 fixed to corresponding values in the initial denoising neural network.

In some other implementations, the system 100 can continue to update the parameters of the core sub-network 128 during the training.

In some cases, the target denoising neural network 102 is used to generate new images conditioned on conditioning inputs 112 that characterize one or more properties of the new image. In these cases, the initial denoising input and the target denoising input 108 each include respective conditioning inputs 112, and each training example includes a respective training conditioning input that characterizes one or more properties of the respective target image in the training example.

Further in some cases, the core sub-network 128 includes one or more conditioning layers that each update a representation input to the conditioning layer conditioned on at least a representation of a corresponding conditioning input 124.

In some cases, the respective conditioning input 112 includes a respective encoded representation of each of one or more context inputs that includes one or more embeddings; the context input can be image(s), text, class label(s), audio sample(s), video(s), sensor data, and so on. Additionally, in some cases, the initial denoising neural network and the target denoising neural network 102 each include a context encoder neural network 118 that is configured to process the respective encoded representations of each of the one or more context inputs to generate a representation of the conditioning input 124 and that is shared between the initial and target denoising neural networks 102.

In some cases, the initial denoising input and the target denoising input 108 each include respective time inputs 114 specifying a time step that defines a noise level for a corresponding noisy image (e.g., a noisy target image 110). Additionally, one or more of the conditioning layers may be conditioned on a representation of a corresponding time input 126.

In some cases, the initial denoising neural network and the target denoising neural network 102 each include a time encoder neural network 120 that is configured to process the respective time input 114 to generate a representation of the respective time input 126 and that is shared between the initial and target denoising neural networks 102.

In some cases, training the target denoising neural network 102 includes training the target encoder sub-network 116 and the target decoder sub-network 132 while updating parameters of the time encoder neural network 120 starting from corresponding values in the initial denoising neural network.

After training the target denoising neural network 102, the system 100 can perform a reverse diffusion process using the target denoising neural network 102 to generate a new image having the target resolution.

To perform the reverse diffusion process, the system 100 can receive a conditioning input (i.e., a new conditioning input).

The system 100 can then initialize a representation of a new image by sampling noise values from a noise distribution. The representation may have the target resolution.

The system 100 can then update the representation of the new image at each of a plurality of reverse diffusion steps.

As part of the updating, at each reverse diffusion step, the system 100 processes a denoising input for the reverse diffusion step that includes the representation of the new image using the target denoising neural network 102 conditioned on the conditioning input to generate a denoising output that defines an estimate of a noise component of the representation of the new image.

In some cases, the denoising input also includes a time input, and the system 100 further conditions the target denoising neural network 102 on the time input to generate a denoising output that defines an estimate of a noise component of the representation of the new image.

Optionally, the system 100 can use classifier-free guidance at each reverse diffusion step. When using classifier-free guidance, the system 100 processes another denoising input for the reverse diffusion step that includes the representation of the new image using the target denoising neural network but not conditioned on the conditioning input to generate another denoising output. The system then combines the conditional and unconditional denoising outputs in accordance with a guidance weight for the reverse diffusion step to generate a final denoising output.

At each reverse diffusion step, the system 100 then updates the representation of the new image using the denoising output.

For example, the system 100 can determine an initial estimate of the final image using the denoising output and then apply an appropriate diffusion sampler, e.g., the DDPM (Denoising Diffusion Probabilistic Model) sampler, the DDIM (Denoising Diffusion Implicit Model) sampler or another appropriate sampler, to the initial estimate of the final image to update the current representation of the new image. At the last reverse diffusion step, the system can use the initial estimate of the final image as the updated representation of the new image.

After updating the representation of the new image at each of the plurality of reverse diffusion steps, the system 100 generates the new image from the representation of the new image. For example, because the representation has the target resolution, the system 100 can directly output the final representation after the updating as the new image.

As described above, each denoising output defines an estimate of a noise component of the corresponding representation of the corresponding image. The denoising output can define this estimate in any of a variety of ways.

In some implementations, the denoising output is an estimate of the noise component of the current representation, i.e., the noise that needs to be combined with, e.g., added to or subtracted to, a final representation to generate the current representation.

In some other implementations, the denoising output is an estimate of the final representation given the current representation, i.e., an estimate of the representation that would result from removing the noise component of the current representation.

In some other implementations, the denoising output defines a predicted residual between the true noise component of the current representation and an analytic estimate of the noise component, i.e., an estimate that has been computed analytically from the current representation.

In some other implementations, the denoising output is a v-parametrization of the estimate of the noise component.

FIG. 2 is a flow diagram of an example process 200 for training a target denoising neural network. For convenience, the process 200 will be described as being performed by a system of one or more computers located in one or more locations. For example, an image generation system, e.g., the image generation system 100 of FIG. 1, appropriately programmed in accordance with this specification, can perform the process 200.

The system obtains data specifying a trained initial denoising neural network (step 202). For example, the system can obtain the data from system-maintained data. As another example, the system can obtain the data from a user or another system through any of a variety of methods, e.g., using a network connection, e.g., a cloud-based network, the internet, or a local network. For example, the system can receive the data from a user using a user device, e.g., a laptop, over a network, e.g., by establishing a network connection with the user device.

The data specifying a trained initial denoising neural network includes any data needed in order to implement or use the initial denoising neural network. For example, the data can include details of the initial denoising neural network architecture, e.g., the number of layers, the type of each layer (e.g., fully connected, convolutional, attention-based, and so on), the layer activation functions, the connectivity of the layers. Additionally, the data can include the trained values of trainable parameters included in the layers.

The initial denoising neural network specified by the data is configured to receive an initial denoising input that includes a noisy initial image having an initial resolution and is configured to process the initial denoising input to generate an initial denoising output that defines an estimate of a noise component of the noisy initial image.

Generally, a noisy initial image is an image that includes pixels values that include random deviations of pixel values from an original pixel value that distort the image.

The term "resolution" refers to the number of pixels that make up an image. The initial resolution can be any number of pixels. For example, the resolution can be expressed as a number of pixels that define the "height" of an image and "width" of an image. So, the initial image can be, e.g., 16×16 (i.e., 256 pixels), 32×32 (i.e., 1,024 pixels), 64×64 (i.e., 4,096 pixels), and so on. Although the example resolutions here and below have two dimensions of equal size, more generally, the resolution can be defined using any number of dimensions, each with its own size.

A pixel value can include one or more numerical values that represents intensity(ies) depending on the type of image.

For example, if the image is a greyscale image, then the pixel value can include a numerical value between 0 and 255 representing a greyscale intensity.

As another example, if the image is a red-green-blue (RGB) image, then the pixel value can include three numerical values (one per red, green, or blue channel) that represent the intensity of the respective color channel.

The estimate of the noise component of the noisy initial image can be an estimate of the random deviations of pixel values that distort the image.

For example, for a pixel value of a non-distorted image that represents a pixel intensity value of 123, the distorted image may have an intensity value of 255, therefore, the random deviation of the pixel value for this case is 123-255=−132.

The initial denoising neural network included in the data includes: (i) an initial encoder sub-network configured to map the noisy initial image to an initial representation of the noisy initial image having a core resolution; (ii) a core sub-network that is configured to process the initial representation having the core resolution to generate an updated representation having the core resolution; and (iii) an initial decoder sub-network configured to map the updated representation having the core resolution to the initial denoising output.

The initial encoder sub-network can have any of a variety of neural network architectures. That is, the initial encoder sub-network can have any appropriate architecture in any appropriate configuration that can map the noisy initial image to an initial representation of the noisy initial image having the core resolution, including fully connected layers, convolutional layers, recurrent layers, attention-based layers, and so on, as is appropriate.

For example, the initial encoder sub-network can include one or more convolutional blocks alternated with pooling or down sampling layers that map the noisy initial image to an initial representation of the noisy initial image having the core resolution.

In some cases, the initial encoder sub-network includes a downsampling convolutional sub-network configured to map the noisy initial image to a downsampled representation having the core resolution and a convolutional encoder sub-network configured to map the downsampled representation to the initial representation of the noisy initial image having the core resolution.

The initial encoder sub-network can include, for example, a downsampling convolutional sub-network configured with a convolving kernel and stride length that can map a noisy initial image to a downsampled representation having the core resolution. Additionally, this example encoder sub-network can include a convolutional encoder sub-network that includes a residual block, containing two layers of convolutions with swish activations.

The core sub-network can have any of a variety of neural network architectures. That is, the core sub-network can have any appropriate architecture in any appropriate configuration that can process the initial representation having the core resolution to generate an updated representation having the core resolution, including fully connected layers, convolutional layers, recurrent layers, attention-based layers, and so on, as is appropriate.

For example, the core sub-network can include a plurality of self-attention layers. For example, the core sub-network can include one or more transformer block layers (which each include self-attention layers) that process the initial representation having the core resolution to generate an updated representation having the core resolution.

The initial decoder sub-network can have any of a variety of neural network architectures. That is, the initial decoder sub-network can have any appropriate architecture in any appropriate configuration that can map the updated representation having the core resolution to the initial denoising output, including fully connected layers, convolutional layers, recurrent layers, attention-based layers, and so on, as is appropriate.

For example, the initial decoder sub-network can include one or more upsampling layers.

In some cases, the initial decoder sub-network includes a convolutional decoder neural network configured to map the updated representation to a decoded representation having the core resolution and an upsampling convolutional sub-network configured to map the decoded representation having the core resolution to the initial denoising output.

For example, the initial decoder sub-network can include a convolutional decoder neural network that includes a residual block, containing two layers of convolutions with swish activations that maps the updated representation to a decoded representation having the core resolution. Additionally, this example initial decoder sub-network can include an upsampling convolutional sub-network that is a subpixel convolutional neural network layer that can map the decoded representation having the core resolution to the initial denoising output.

Specific layers within such initial denoising neural networks may perform distinct functions. For instance, text encoding layers may be configured to process one or more textual, character, or multimodal representations (derived, for example, from models such as T5-XXL, CLIP (ViT-H 14), or ByT5) and project these representations into an embedding space suitable for processing by the initial core sub-network. Such layers may utilize operations like pooling followed by a Multi-Layer Perceptron (MLP). Furthermore, layers belonging to the initial core-subnetwork may include hidden layers that interface with the embedded representations through cross-attention mechanisms. These may include layers operating at a particular resolution (e.g., a lower resolution in a UNet structure) where features are combined with embedded text representations via cross-attention. Additionally, time encoding layers may be configured to map a diffusion time step input into an embedding space, for example, using a sinusoidal positional encoder followed by a shallow MLP.

As one example of how components for the initial denoising neural network may be structured, certain implementations may utilize a specific architecture during an initial training phase. One such architecture includes an initial encoder sub-network and initial decoder sub-network operating on a fixed spatial grid (e.g., 16×16 pixels). The encoder and decoder may each utilize a single residual block and operate without upsampling or downsampling layers, thereby sharing the spatial grid resolution with certain initial core sub-network layers. A first convolutional layer may project a received input image to this predetermined spatial grid, potentially expanding input channel dimensions (e.g., to 256). A corresponding upsampling head (e.g., involving subpixel convolution) may map representations from the predetermined grid towards a target output resolution. Variations in the number of transformer blocks (e.g., 6, 8, 12, 16), hidden size (e.g., 1536 to 4096), and MLP channel dimensions within the representation layers can yield models with different parameter counts (e.g., approximately 672 M to 7.7B parameters).

In some cases, when the system obtains data specifying the trained initial denoising neural network, the system trains the initial denoising neural network using initial training data that includes a plurality of initial images having the initial resolution and on the denoising objective.

The system obtains training data that includes a plurality of training examples, where each training example includes a respective target image having a target resolution that is higher than the initial resolution (step 204). The system can obtain the training data from system-maintained data, a user, or another system through any of a variety of methods, e.g., the system can obtain training data over a network connection from another system.

A target resolution being higher than the initial resolution generally refers to the target resolution having more pixels than the initial resolutions. For example, if the initial resolution is 16×16 (i.e., 256 pixels), the target resolution can be 32×32 (i.e., 1,024 pixels), 64×64, 128×128, 256×256, 512×512, 1,024×1,024 and so on.

In some cases, the core resolution is smaller than the initial and target resolutions. For example, if the initial resolution is 32×32 and the target resolution is 1,024×1,024, then the core resolution can be 16×16. In other cases, the core resolution is equal to the initial resolution. For example, if the initial resolution is 32×32, then the core resolution is 32×32, or if the initial resolution is 16×16, then the core resolution is 16×16, and so on.

The system trains, using the training data and on a denoising objective, a target denoising neural network (step 206).

The target denoising neural network is configured to receive a target denoising input that includes a noisy target image having the target resolution and to process the target denoising input to generate a target denoising output that defines an estimate of a noise component of the noisy target image.

The target denoising neural network includes (i) a target encoder sub-network configured to map the noisy target image to an initial representation of the noisy target image having the core resolution; (ii) the core sub-network; and (iii) a target decoder sub-network configured to map an updated representation of the noisy target image having the core resolution and generated by the core-subnetwork to the target denoising output.

While the core sub-network of the target denoising neural network is the core sub-network of the initial denoising neural network, the target encoder sub-network is not the initial encoder sub-network, and the target decoder sub-network is not the initial decoder sub-network. In this way, the system uses the core sub-network in the target denoising neural network to process a representation having a core resolution to generate an updated representation having the core resolution just as it does with the initial denoising neural network. But the system uses the target encoder/decoder sub-networks of the target denoising neural network for target resolution encoding/decoding. That is, the system uses the target encoder sub-network for generating the initial representation with a core resolution from a noisy target image with a target resolution, and the target decoder sub-network for mapping the updated representation of the noisy target image having the core resolution to the target denoising output that defines an estimate of a noise component of the noisy target image with the target resolution.

The denoising objective can be any objective that when used to train the target denoising neural network results in improving (relative to before training the target denoising neural network) the denoising neural network's generated target denoising output that defines an estimate of a noise component of the noisy target image. For example, the following equation $$E_{x_0 \sim q(x_0), \epsilon \sim N(0,1), t \sim U(1,T)}\left[\|\epsilon - \epsilon_\theta(x_t, t)\|^2\right]$$

defines an objective function, where t represents a time step in a diffusion process that includes T time steps, $E_{t \sim U(1,T)}$ denotes taking an expectation over time steps sampled from the T diffusion time steps, $x_0$ represents a target image, $E_{x_0 \sim q(x_0)}$ denotes taking an expectation over the target images of the training data according to the probability of mass of the target image over the training data $q(x_0)$, $\epsilon$ represents the noise component added to the target image that is responsible for mapping $x_0$ to $x_t$ (the noisy target image of $x_0$ at time step t), $E_{\epsilon \sim N(0,1)}$ denotes an expectation over the noise components sampled from a Gaussian normal distribution with a mean of 0 and isotropic covariance of 1, and $[\|\epsilon - \epsilon_\theta(x_t, t)\|^2]$ represents the squared norm of the difference between the true noise $\epsilon$ and the target denoising neural network estimate of a noise component of the noisy target image $\epsilon_\theta(\cdot)$ (where $\theta$ signifies the target denoising neural network includes trainable parameters). When the system minimizes this objective function through training the target denoising neural network, the result is the denoising outputs that define the noise component of a respective noisy target image generated by the denoising neural network more accurately.

In some embodiments, a specific procedure for performing the training of the target denoising neural network may involve a multi-phase process. In a first phase, certain components intended for the target denoising neural network, such as layers of the core sub-network and text/time encoding layers, may be trained. This training may occur within a proxy architecture using a collection of text-image pairs (e.g., the CC12M dataset) potentially at a first resolution (e.g., 64×64).

In a second phase, the target denoising neural network architecture (e.g., one that includes a U Net structure operating at multiple resolutions) may be constructed. Components trained in the first phase (e.g., layers of the core sub-network, text encoding layers) may be initialized with their parameters obtained from the first phase. Additional components, such as encoder sub-network and decoder sub-network layers operating at different resolutions, may be added and may be initialized randomly. During training in this second phase, the parameters of the previously trained layers of the core sub-network and text encoding layers may be kept frozen. Parameters of the time encoding layers and the newly added encoder/decoder sub-network layers may be updated (tuned). This second phase training typically uses a training dataset that includes images at the target resolution (e.g., 512×512 or 1024×1024). The diffusion logSNR (signal-to-noise) shift may optionally be adjusted for the target resolution (e.g., by a factor of 2 log(64/d), following arXiv:2301.11093). Training in this phase may be conducted using specific batch sizes (e.g., a batch size of 256) and without utilizing certain forms of regularization like dropout or multi-scale loss.

In an optional third phase, parameters previously held fixed in the second phase may be unfrozen, and all parameters of the target denoising neural network may be jointly updated.

Specific configurations and data parameters may be used in implementations of the training process described above.

For example, for text conditioning, embeddings from multiple text encoders, such as T5-XXL (e.g., 128 sequence length) and CLIP (e.g., ViT-H 14, 77 sequence length), may be generated from a prompt, concatenated (e.g., yielding a 205 length sequence), and processed by text encoding layers. Additional encoders like ByT5 (e.g., 256 sequence length) may also be incorporated, resulting in longer combined sequences (e.g., 461). The training data may differ between phases; for example, a first phase may use the C C12M dataset (~12M images) at 64×64 resolution, while a second phase may use a subset thereof (e.g., 8.7M images) filtered for a target resolution like 512×512. Training may occur for a predetermined number of iterations (e.g., 2M iterations for a first phase, 1M iterations for a second phase). Aspect ratio bucketing may be employed to handle image dimensions such as (1024, 1024), (768, 1376), and (1376, 768).

In some cases, the system trains the target denoising neural network by training the target encoder sub-network and the target decoder sub-network while holding parameters of the core sub-network fixed to corresponding values in the initial denoising neural network.

In some cases, the system generates initial and target denoising outputs using initial and target denoising neural networks (respectively) that are each conditioned on respective additional available inputs.

In some cases, for example, the initial denoising input and the target denoising input each additionally include respective conditioning inputs, and each training example further includes a respective training conditioning input that characterizes one or more properties of the respective target image in the training example.

In some implementations, the respective conditioning input includes a respective encoded representation of each of one or more context inputs that includes one or more embeddings. For example, the context input can include one or more embeddings (or one or more encoded representations) that represent, e.g., one or more of text, image(s), sensor data, bounding box(es), semantic map(s), and so on, and the context inputs can be those generated using a pretrained neural network model, e.g., pre-trained text or image embedding models.

In some implementations, the core sub-network (belonging to both the initial and target denoising neural networks) can include one or more conditioning layers that each update an input representation to the conditioning layer conditioned on at least a representation of a corresponding conditioning input. For example, the one or more conditioning layers can be cross-attention layers.

As a particular example, the core sub-network can include one or more cross-attention layers that each cross attend its input representation to a system-received representation of a conditioning input generated from a sequence of text.

The sequence of text can be any sequence of text. For example, the sequence of text can be a description that influences the resulting image generated by the image generation system. For example, the sequence of text can be a label, description of visual features to include, a style for the image to take on, effects that are requested to be present in the image, etc. Some examples of sequences of text include "A futuristic street train a rainy street at night in an old European city. Painting by David Friedrich, Claude Monet and John Tenniel.", "Realistic photograph of a cute otter zebra mouse in a field at sunset, tall grass, macro 35 mm film" or "Silver 1963 Ferrari 250 GTO in profile racing along a beach front road. Bokeh, high-quality 4 k photograph."

Further in other implementations, the initial denoising neural network and the target denoising neural network each include a context encoder neural network that is configured to process the respective encoded representations of each of the one or more context inputs to generate a representation of the conditioning input.

The context encoder neural network can have any of a variety of neural network architectures. That is, the context encoder neural network can have any appropriate architecture in any appropriate configuration that can process the respective encoded representations of each of the one or more context inputs to generate a representation of the conditioning input, including fully connected layers, convolutional layers, recurrent layers, attention-based layers, and so on, as is appropriate.

As a particular example, the context encoder neural network can include one or more pooling layers and a multi-layer perceptron layer, or an attention pooling sub-network followed by a multi-layer perceptron (M LIP). The context encoder neural network can process a conditioning input that includes one or more textual, character, and/or multimodal encoded representations to generate a representation of the conditioning input. For example, the system can process a text prompt by first tokenizing the text prompt, then use the pre-trained models T5-XXL with 128 sequence length and CLIP (VIT-H 14) with 77 sequence length to generate two sequences of embeddings of the text prompt (i.e., two context inputs that make up the conditioning input), and then process this conditioning input using the context encoder neural network to generate a representation of the conditioning input.

In some cases, when the system trains the target denoising neural network, the system trains the target encoder sub-network and the target decoder sub-network while holding parameters of the core sub-network and the context encoder neural network fixed to corresponding values in the initial denoising neural network.

In some implementations, the initial denoising input and the target denoising input each include respective time inputs specifying a time step that defines a noise level for a corresponding noisy image. Additionally, for these implementations, one or more of the conditioning layers are conditioned on a representation of a corresponding time input.

In some implementations, the initial denoising neural network and the target denoising neural network each can include a time encoder neural network that is configured to process the respective time input to generate a representation of the respective time input.

The time encoder neural network can have any of a variety of neural network architectures. That is, the time encoder neural network can have any appropriate architecture in any appropriate configuration that can process the respective time input to generate a representation of the respective time input, including fully connected layers, convolutional layers, recurrent layers, attention-based layers, and so on, as is appropriate.

For example, the time encoder neural network can be a sinusoidal positional encoder, followed by a shallow MLP.

In some cases, when the system trains the target denoising neural network, the system trains the target encoder sub-network and the target decoder sub-network while updating parameters of the time encoder neural network neural network starting from corresponding values in the initial denoising neural network.

Further details of updating the trainable parameters of the target denoising neural network during training are described below with reference to FIG. 3.

In some cases, after training the target denoising neural network, the system performs a reverse diffusion process using the target denoising neural network to generate a new image having the target resolution. For example, the reverse diffusion process can include the system, for each of plurality of reverse diffusion steps, updating a representation of a new image using the denoising output of the target denoising neural network. Then, after the last update of the last reverse diffusion step, the system generates the new image.

Further in some cases, the system performs the reverse diffusion process conditioned on a new conditioning input (e.g., text embeddings). That is, when the initial denoising input, the target denoising input, and each training example include conditioning inputs (or training conditioning inputs) that characterize one or more properties, the system can perform the reverse diffusion process conditioned on a respective conditioning input.

Further details of an example process for generating a new image using a reverse diffusion process are described below with reference to FIG. 4.

Figure 3:
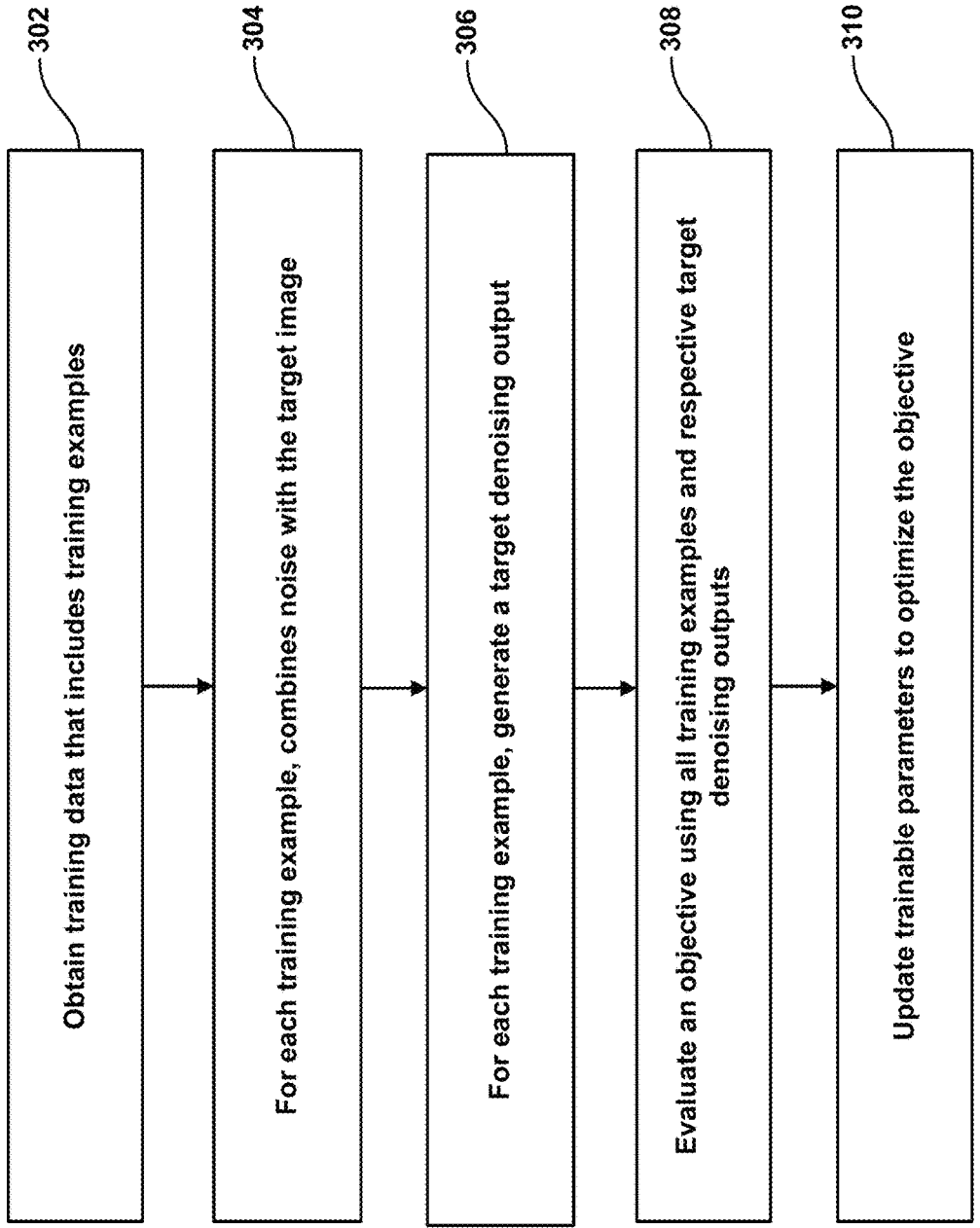
FIG. 3 is a flow diagram of an example process for updating trainable parameters of a target denoising neural network.

FIG. 3 is a flow diagram of an example process 300 for updating trainable parameters of a target denoising neural network. For convenience, the process 300 will be described as being performed by a system of one or more computers located in one or more locations. For example, an image generation system, e.g., the image generation system 100 of FIG. 1, appropriately programmed in accordance with this specification, can perform the process 300.

The system or another training system repeatedly updates the trainable parameters of the target denoising neural network using training data. That is, the system can repeatedly perform the following described example process using training examples to repeatedly update the trainable parameters of the target denoising neural network from scratch, i.e., train from randomly initialized parameters, or to fine-tune, i.e., further update previously determined parameters.

As described above, the set of trainable parameters are not necessarily all the parameters included in the denoising neural network. For instance, of the elements of the target denoising neural network (i.e., target decoder sub-network, core sub-network, target encoder sub-network, context encoder neural network, time encoder neural network, etc.), the system can configure the updating of trainable parameters to include trainable parameters only belonging to a subset of these components.

The system obtains training data that includes training examples (step 302). As described above, the system can obtain the training data from system-maintained data, a user, or another system through any of a variety of methods.

As described above, the training data includes a plurality of training examples, and each training example includes a respective target image having a target resolution that is higher than the initial resolution of the initial denoising neural network is configured to receive.

The system, for each training example, combines noise with the target image (step 304). The result is a noisy target image. The system can determine the noise and combine the noise with the target image to generate the noisy target image using any of a variety of methods.

For example, the system can sample noise from a noise distribution, e.g., probability distribution, e.g., a Gaussian probability distribution, with the same number of dimensions as the number of pixels included in the target image (i.e., the number dimensions of the target image) and elementwise sum the sampled noise with the pixel values of the target image to generate the noisy target image.

In some cases, the system can determine the noise according to one or more time steps, particularly when time steps define noise levels for corresponding noisy images.

For example, the system can use a Markovian process to generate a noisy target image, e.g., the forward process of DDPM. That is, given a target image, a number of diffusion steps (i.e., time steps), and variance schedule across diffusion steps, the system can generate the noisy target image by drawing samples for parameterized normal distributions.

For example, the recursive equation $$N\left(x_t; \sqrt{1 - \beta_t}\, x_{t-1}, \beta_t \cdot I\right), \forall\, t \in 1, \ldots, T$$

represents how the system can generate the noisy target image $x_t$ associated with time step t by repeatedly sampling parameterized Gaussians, where T is the number of diffusion steps, $\beta_1, \ldots, \beta_T \in [0,1)$ are the variance schedule values across diffusion steps, I is the identity matrix having the same dimensions as the input image $x_0$, $\sqrt{1-\beta_t x_{t-1}}$ is the scaled noisy target image of a previous diffusion step, and $N(x; \mu, \sigma)$ represents the normal distribution of mean $\mu$ and covariance $\sigma$ that produces x.

As another example, the equation $$x_t = \sqrt{\overline{\alpha}_t}\, x_0 + \sqrt{1 - \overline{\alpha}_t}\, \epsilon$$

also represents how the system can generate the noisy target image $x_t$, where $\epsilon$ is noise sampled from a Gaussian distribution, i.e., $\epsilon \sim N(0, I)$, and $$\overline{\alpha}_t = \prod_{s=1}^{t} (1 - \beta_s).$$

Moreover, the system can combine one or more different noises with the same target image to generate one or more respective noisy target images. For example, considering the previous example of generating a noisy target image by sampling $\epsilon$, the system can sample one or more values of $\epsilon$ for the same time step t, for one or more time steps, or both, to generate one or more noisy target images.

The system, for each training example, generates a target denoising output (step 308).

In other words, for each noisy target image generated during step 306, the system uses the denoising neural network to process at least the noisy target image to generate a target denoising output that defines an estimate of a noise component of the noisy target image.

For cases that the system uses a time step to generate the noisy target image from the target image of the training example, the system can use the target denoising neural network to generate the denoising output that additionally processes at least the respective time step of the noisy target image.

As described above, in some cases, each training example further includes a respective training conditioning input that characterizes one or more properties of the respective target image in the training example. For such cases, the system can use the target denoising neural network to generate the denoising output that additionally processes at least the conditioning input.

The system evaluates an objective using all training examples and respective target denoising outputs (step 310).

Generally, the objective evaluates the performance of the target denoising outputs the system produces using the target denoising neural network during step 308. For example, the objective (or objective function) can include a loss for each training example. For example, the objective can be represented as the equation $$E_{x_0 \sim q(x_0), \epsilon \sim N(0,1), t \sim U(1,T)}\left[\left\|\epsilon - \epsilon_\theta\left(\sqrt{\overline{\alpha}_t}\, x_0 + \sqrt{1-\overline{\alpha}_t}\,\epsilon, t\right)\right\|^2\right]$$

where $\epsilon$ denotes an expectation over target images (i.e., $x_0 \sim q(x_0)$, where $q(x_0)$ represents the probability of sampling the target image $x_0$ according to the training data), over sampled noise (i.e., $\epsilon \sim N(0,1)$), over time steps (i.e., $t \sim U(1, T)$, where $U(1, T)$ denotes a uniform distribution of time steps from 1 to T). Additionally, the term $\sqrt{\overline{\alpha}_t}x_0 + \sqrt{1-\overline{\alpha}_t}\epsilon$ is the noisy target image (as described in an example above), and the term $\epsilon_\theta(\cdot)$ refers to the estimate of the noise component of the noisy target image generated by the target denoising neural network.

In some cases, the objective includes one or more regularization terms that penalizes higher values for the trainable parameters to reduce the risk of the trainable parameters of the target denoising model overfitting the training data. For example, the regularization terms can include the L P regularization term $$\lambda\|w\|_p^p,$$

where $\lambda$ is the regularization parameter, w is the vector of trainable parameters, and p is the norm degree (e.g., p=1 for L1 regularization, p=2 for L2 regularization).

The system, updates trainable parameters to optimize the objective (step 312).

The system can update the trainable parameters of the target denoising neural network to optimize the objective in any variety of ways, e.g., gradient based method, evolutionary algorithm-based method, Bayesian optimization, etc.

For example, the system can optimize the objective using any of a variety of gradient descent techniques (e.g., batch gradient descent, stochastic gradient descent, or mini-batch gradient descent) that include the use of a backpropagation technique to estimate the gradient of the loss with respect to trainable parameters of the neural network and to update the learnable parameters accordingly.

Generally, the system repeats the above steps until one or more criteria are satisfied (e.g., the system performs a pre-determined number of iterations, the updates to the trainable parameters no longer exceed a pre-determined magnitude of change, a metric regarding a validation dataset exceeds a pre-determined value, and so on).

Figure 4:
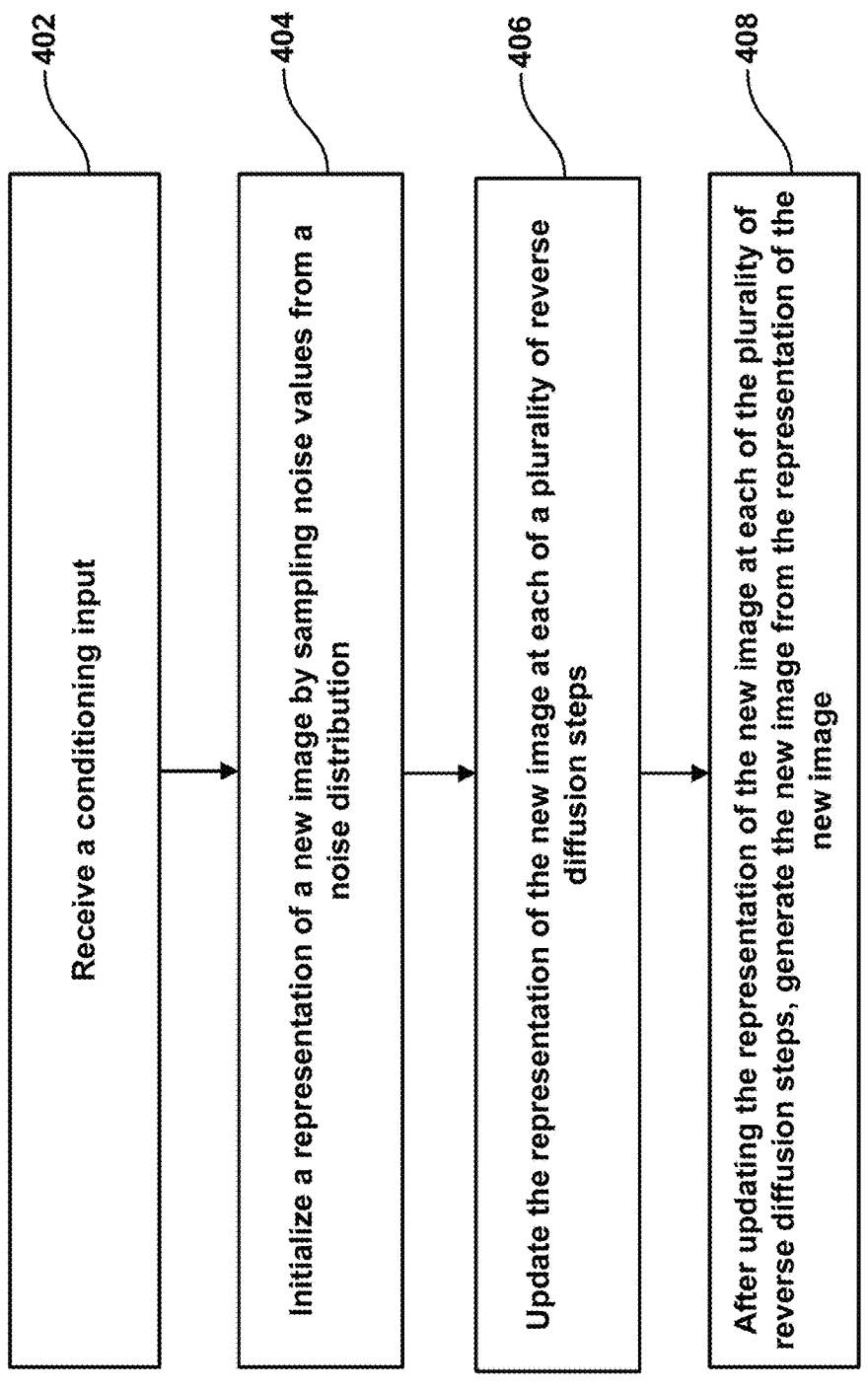
FIG. 4 is a flow diagram of an example process for generating a new image using a reverse diffusion process.

FIG. 4 is a flow diagram of an example process 400 for generating a new image. For convenience, the process 400 will be described as being performed by a system of one or more computers located in one or more locations. For example, an image generation system, e.g., the image generation system 100 of FIG. 1, appropriately programmed in accordance with this specification, can perform the process 400.

The system receives a conditioning input (step 402). As described above, generally, the conditioning input characterize one or more properties of the new image, and examples include one or more encodings of a text sequence, another image, a class label, and so on.

For implementations that the conditioning input includes a text sequence, the system can process the text sequence using each of a plurality of text encoder neural networks to generate a respective encoded representation of the text sequence for each of the text encoder neural networks. Then, the system can combine the respective encoded representation of the text sequence for each of the text encoder neural networks to generate a combined encoded representation. In which case, the denoising input for each reverse diffusion step (described below) includes the combined encoded representation.

As one example, the plurality of text encoder neural networks can be three neural networks such as T5-XXL (as described in arX iv:1910.10683), Clip (as described in arX iv:2103.00020), and ByT5 (as described in arX iv:2105.13626).

The system can combine the respective encoded representation of the text sequence for each of the text encoder neural networks to generate a combined encoded representation in any of a variety of ways. For example, the system can generate a combined encoded representation by first concatenating the respective encoded representation of the text sequence for each of the text encoder neural networks to generate a concatenated encoded representation. Then, processing the concatenated encoded representation using a context encoder neural network to generate the combined encoded representation.

In some cases, the plurality of text encoder neural networks has been trained independently of one another. For example, the text encoder neural networks can each have been trained using different training settings, different training data, different objectives, and so on.

The system initializes a representation of a new image by sampling noise values from a noise distribution (step 404). In other words, the system sets the pixel values of a representation of a new image using noise values of sampled noise, where each dimension of the sampled noise represents a pixel value. The system can draw the sampled noise values from any of a variety of probability distributions, e.g., a multivariate Gaussian with isotropic covariance.

The system updates the representation of the new image at each of a plurality of reverse diffusion steps (step 406). In particular, the system processes a denoising input for the reverse diffusion step that includes the representation of the new image using a denoising neural network conditioned on the conditioning input to generate a denoising output that defines an estimate of a noise component of the representation of the new image; the denoising neural network that the system uses can be any example target denoising neural network described above. The system then updates the representation of the new image using the denoising output.

For example, for a given diffusion step, when the system applies the DDPM diffusion sampler, the system can subtract the estimate of the noise component of the representation of the new image from the representation of the new image (e.g., an elementwise subtraction of estimated noise values of the estimated noise component from pixel values of the representation of the new image), and optionally can add back in a small amount of noise. The result is the updated representation of the new image.

As another example, for a given diffusion step, when the system applies the DDI M diffusion sampler, the system can determine an initial estimate of the final representation of the new image using the representation of the new image for the current diffusion step. The system then can generate the updated representation of the new image using the initial estimate of the final representation of the new image and the representation of the new image of the current diffusion step. The result is the updated representation of the new image.

After generation, the updated representation of the new image can be included in the denoising input of the subsequent diffusion step as the representation of the new image.

A s described above, the system in some cases uses classifier-free guidance at each reverse diffusion step. When using classifier-free guidance, the system processes the denoising input for the reverse diffusion step that includes the representation of the new image using the target denoising neural network but not conditioned on the conditioning input to generate another denoising output. The system then combines the conditional and unconditional denoising outputs in accordance with a guidance weight for the reverse diffusion step to generate a final denoising output.

For example, the following equation $$\tilde{\epsilon}_\theta(x_t, c) = (1 + w)\epsilon_\theta(x_t, c) - w\epsilon_\theta(x_t)$$

represents how the system can use classifier-free guidance at each reverse diffusion step, where the term $\tilde{\epsilon}_\theta(x_t, c)$ denotes the final denoising output, w the guidance weight, $x_t$ the representation of the new image, c the conditioning input, and $\epsilon_\theta(x_t, c)$ the conditional denoising output and $\epsilon_\theta(x_t)$ the unconditional denoising output.

Methods for selecting the guidance weight hyperparameter used in classifier-free guidance can include considering various metrics. For instance, metrics evaluating image feature distributions, such as Fréchet Distance calculated on Dino-v2 features (FD-Dino) or CLIP Maximum Mean Discrepancy (CMMD), can be considered alongside or as alternatives to other metrics like FID and CLIP score. The response curve of the generated images according to these different metrics may be analyzed across varying guidance weights. For example, minimizing FD-Dino has been observed to correlate with certain properties like natural color distributions and object shapes, while minimizing CMMD may correlate with properties like initial signs of color saturation. A guidance weight may be selected from the range defined by the minima of such different metrics (e.g., the range between the FD-Dino minimum and the CMMD minimum). Based on such analysis, example guidance values used in specific implementations were 1.75 for certain SU-derived models and 4.0 for certain full UViT-derived models.

Generally, the system performs a pre-determined number of reverse diffusion steps set by a user, the system, or another system. For example, the system can receive the number of reverse diffusion steps from a user.

In some cases, the denoising input for the reverse diffusion step includes a respective time input. For such cases, the system can determine the number of reverse diffusion steps to be, e.g., aligned with the number of timesteps used to train the denoising neural network, e.g., aligned with the number of time steps sampled to generate noisy target images from a target image as described above with respect to training a denoising neural network in example 300.

The system, after updating the representation of the new image at each of the plurality of reverse diffusion steps, generates the new image from the representation of the new image (step 408).

In some implementations, the system outputs, as the new image, the representation of the new image after being updated at each of the plurality of reverse diffusion steps. In other words, the system outputs as the new image the most recently updated representation of the new image.

Prior to using the denoising neural network to generate a new image using a reverse diffusion process, e.g., example process 400 above, the system or another system trains the denoising neural network; the term "training system" will represent either case.

In some cases, the training system trains the denoising neural network on first training data that includes a plurality of first training images and on a denoising objective.

The first training data can include images of any one or more style(s), type(s), or characteristic(s), e.g., everyday scenes (e.g., scenes of nature or urban environments), extraordinary scenes (e.g., scenes of fantasy worlds), art of any genre, objects with any properties, any type of animals, and so on. For example, the training system can train the denoising neural network using first training data that includes images scraped indiscriminately from the internet.

The denoising objective can be any of a variety of objectives, e.g., any of the example objectives described above with reference to FIG. 3.

Further in some cases, the training system trains the denoising neural network on second training data after training it on the first training data, where the second training data is one generated from a mixed set of images that includes the first training images and a plurality of second training images that are classified as aesthetic images. That is, the training system further trains the denoising neural network using a second training data that includes aesthetic images.

Additionally in some cases, the second training images are a proper subset of the first training images that are classified as conforming to aesthetic and compositional attributes (e.g., "cartoon", "vintage", or "Sci-Fi") by an image classification neural network. In other words, the training system fine-tunes the denoising neural network using second training data that includes a particular class of aesthetic images (e.g., style of images) as determined by an image classification neural network.

As a particular example, the training system can use an image classification neural network that discriminates between specific aesthetic and compositional attributes (e.g., a classifier neural network that discriminates between images in the style of "newspaper cartoons" and not) to select a proper subset of images from among the first training images as the second training images. The training system can then use this second training data to train the denoising neural network. Additionally, the training system can add a special token to a text prompt that serves as the text for a conditioning input when generating denoising outputs for second training images during training. By including the special token into the text prompt for the second training images, the denoising neural network training will result in a denoising neural network that is particularly suitable for generating images of the specific aesthetic and compositional attributes of the second training images. Also, by "finetuning" on a mixture of the first and second training images, the denoising neural network training can avoid "catastrophic forgetting" (i.e., forgetting previously learned information upon learning new data) and the introduction of "artifacts" (i.e., unintended or undesirable elements that appear in the generated outputs) during the training process.

For some cases, after further training the denoising neural network on the second training data, the training system trains the denoising neural network further on third training data on a consistency distillation objective. In other words, the system trains a consistency model using the denoising neural network and then replaces the denoising neural network with the consistency model. Examples of this training now follows.

For example, in some cases, the system trains a consistency neural network that serves to replace the denoising neural network and generates new images in fewer reverse diffusion steps (i.e., the system distills the denoising neural network using a consistency neural network). That is, in some cases, the system trains a consistency neural network using a consistency distillation objective that includes the losses between the consistency neural network denoising outputs and the target denoising neural network denoising outputs (which are the training examples included in the third training data) across several reverse diffusion steps. The system then replaces the target denoising neural network with the consistency neural network such that the consistency neural network receives a target denoising input that includes a noisy target image having the target resolution and to process the target denoising input to generate a target denoising output that defines an estimate of a noise component of the noisy target image.

The consistency neural network can have any of a variety of neural network architectures. That is, the consistency neural network can have any appropriate architecture in any appropriate configuration that can process target denoising input that includes a noisy target image having the target resolution to generate a target denoising output that defines an estimate of a noise component of the noisy target image, including fully connected layers, convolutional layers, recurrent layers, attention-based layers, and so on, as is appropriate.

Generally, if generating a new image using the denoising neural network requires x reverse diffusion steps, then generating a new image using the consistency neural network requires y reverse diffusion steps such that x>y.

For example, the system can train a consistency neural network that processes target denoising input to generate a target denoising output that defines an estimate of a noise component of the noisy target image such that only 1, 2, 4, or 8 reverse diffusion steps are used to generate a new image, while the denoising neural network requires greater than 1, 2, 4, or 8 reverse diffusion steps respectively to generate a new image.

As another example, the system can train a consistency neural network that includes multiple sub-networks each responsible for separate contiguous reverse diffusion steps when generating a new image and that all share the same parameters. For example, the system can train a multistep consistency model as described in arX iv:2403.06807.

Generally, the consistency distillation objective is one that results in, after training, the consistency neural network denoising output better matching that of the denoising neural network. For example, the consistency distillation objective can be $$E_{x_0,t}\|f(x_t, t) - nograd(f(x_s, s))\|$$

where the expectation is taken over various reverse diffusion steps which are indexed as t and various target images $x_0$, e.g., the target images of the training data of the denoising neural network; the index s is also for a reverse diffusion step index such that s<t and the diffusion steps are indexed from T to 0 where T is the first step and 0 the last; $f(x_t, t)$ is the denoising output of the consistency neural network that processes the denoising input for the reverse diffusion step that includes the representation of the new image $x_t$ according to the reverse diffusion step index t; $nograd(f(x_s, s))$ is the denoising output of the consistency neural network that processes the denoising input for the reverse diffusion step that includes the representation of the new image $x_s$ according to the reverse diffusion step index s, where the system generates $x_s$ using the denoising neural network, e.g., using a D DIM sampler with the denoising neural network as described above for example process 400 to generate $x_s$ from $x_t$ and nograd($\cdot$) indicates that the term is not differentiable. In some cases, the value of the reverse diffusion step s is 0 (i.e., s corresponds the final reverse diffusion step), in other cases the value of the reverse diffusion step s is T<s<0 (i.e., s can correspond to any reverse diffusion step that is not the last reverse diffusion step).

The system can repeatedly update the trainable parameters of the consistency neural network to optimize the consistency distillation objective in any variety of ways, e.g., gradient based method, evolutionary algorithm-based method, Bayesian optimization, etc. For example, the system can optimize the consistency distillation objective using any of a variety of gradient descent techniques (e.g., batch gradient descent, stochastic gradient descent, or mini-batch gradient descent) that include the use of a backpropagation technique to estimate the gradient of the loss with respect to trainable parameters of the consistency neural network and to update the learnable parameters accordingly. Generally, the system repeats updating the trainable parameters until one or more criteria are satisfied (e.g., the system performs a pre-determined number of iterations, the updates to the trainable parameters no longer exceed a pre-determined magnitude of change, a metric regarding a validation dataset exceeds a pre-determined value, and so on).

Providing further detail on these optional steps, style finetuning may involve using an image classifier to select a subset of training images (e.g., 3 k images) based on aesthetic or compositional attributes. The target denoising neural network may then be further trained using a mixture of the original training data and this selected aesthetic subset (e.g., for 8 k steps). During this mixed training, a designated token may be added to the text prompt for images from the aesthetic subset to guide the conditioning. Regarding distillation, techniques based on consistency models, such as the Multistep Consistency Model (MCM) described by H eek et al. (2024), can be applied to the trained target denoising neural network. This can yield a distilled model requiring fewer sampling steps (e.g., reducing from 256 steps to 16 steps) for image generation.

FIG. 5 is an example 500 of the performance of the described techniques.

In particular, example 500 is a table that shows how various subsets of the features of the described techniques (Vermeer: raw model, +prompt engineering, +style tuning, +distilled) and another technique (i.e., SDXL(v1.0)) perform with respect to image distribution metrics (i.e., FID or Fréchet Inception Distance as described in arX iv:1706.08500, FD-Dino or Fréchet Distance on Dino-v2 feature space as described in arX iv:2304.07193 and arX iv:2306.04675, CMMD or Clip Maximum Mean Discrepancy distance as described in arX iv:2401.09603, i.e., metrics that quantify how similar the statistical distributions of properties of groups of images are) and text-image alignment (i.e., $CLIP_{score}$) evaluated on the MS-COCO image captioning dataset (image-caption pairs covering a diverse set of object categories and scenes). That is, each row corresponds to a technique and each column corresponds to a metric evaluated on a set of image-caption pairs where the caption of the pair is used as the text sequence for a conditioning input to generate a new image that should correspond to the image of the image-caption pair.

The various subsets of the elements of the described techniques are used to generate images using a denoising neural network and include: raw model, which refers to training the denoising neural network using first training data; (ii) +prompt engineering, the same as raw model but augmenting the text sequence of the condition input to include words to improve the aesthetic image quality of new images; (iii) +style tuning, style finetuning the denoising neural network of raw model on a second training dataset that includes a curated subset of 3K aesthetically pleasing images; and (iv) +distilled, training a consistency model using the denoising neural network of raw model on a consistency distillation objective. The other technique SDXL is a latent diffusion based model (as described in arX iv:2307.01952).

Example 500 shows that the raw model minimizes image distribution metrics that use state of the art feature space, i.e., FD-Dino and CMMD. Unlike FID, which relies on features from an older Inception neural network, FD-Dino and CMMD capture more subtle and difficult to identify features about objects and scene structure of an image. Therefore, the better performance on FD-Dino and CMMD compared to FID on the MS-COCO data set is significant because the newer metric evaluate image quality in a more semantically meaningful space. Furthermore, since MS-COCO consists of diverse real-world images captured using various cameras and sensors in various real-world environments, these low scores indicate that the statistical distribution of features in the images generated by the raw model closely aligns with the distribution found in this large corpus of real-world imagery, suggesting a strong fidelity to real-world visual characteristics. That is, the images generated using the described techniques are more faithful to the semantic attributes of real-world objects and scenes, suggesting the images generated using the described techniques are highly realistic.

These metrics also highlight a significant shift away from the distribution of MSCOCO-captions, after augmenting the prompts (+prompt engineering) that further increases when combined with finetuning of the denoising neural network for an aesthetically pleasing image (+style finetuning). The shifts away from the distribution of MSCOCO-captions of +prompt engineering and +style finetuning are intentional because the images generated using these techniques improve aesthetic appeal, not the faithfulness to the MSCOCO images. The evaluation of the improvement of aesthetic appeal is left to FIG. 7 below.

Example 500 also shows a CLIP-score that suggests a minor drop in terms of text-to-image alignment of the described techniques compared to SDXL. Although, the CLIP-score remains relatively consistent for the described techniques, suggesting the core subnetwork can maintain the bulk of the image generation system's text-to-image alignment ability (i.e., its conditioning-input-to-image alignment).

FIG. 6 is an example 600 of the performance of the described techniques.

In particular, example 600 is a table that shows how various subsets of the features of the described techniques (Vermeer: raw model, +prompt engineering, +style tuning, +distilled) and another technique (i.e., SDXL(v1.0), SD2.1, M use, Imagen Cascade) perform with respect to the text-image alignment metric Davidsonian Scene Graph (DSG)-1 k (as described in arX iv:2310.18235), an open-sourced evaluation benchmark that includes 1,060 prompts, covering a wide range of fine-grained semantic categories with a balanced distribution, an empirically grounded evaluation framework inspired by formal semantics. The higher the DSG score the better the performance of the technique.

Example 600 shows that the described techniques present competitive performance with SDXL, and surpasses the other techniques, including the auto-regressive technique (i.e., M use) and cascade models technique (i.e., Imagen Cascade).

Figure 7:
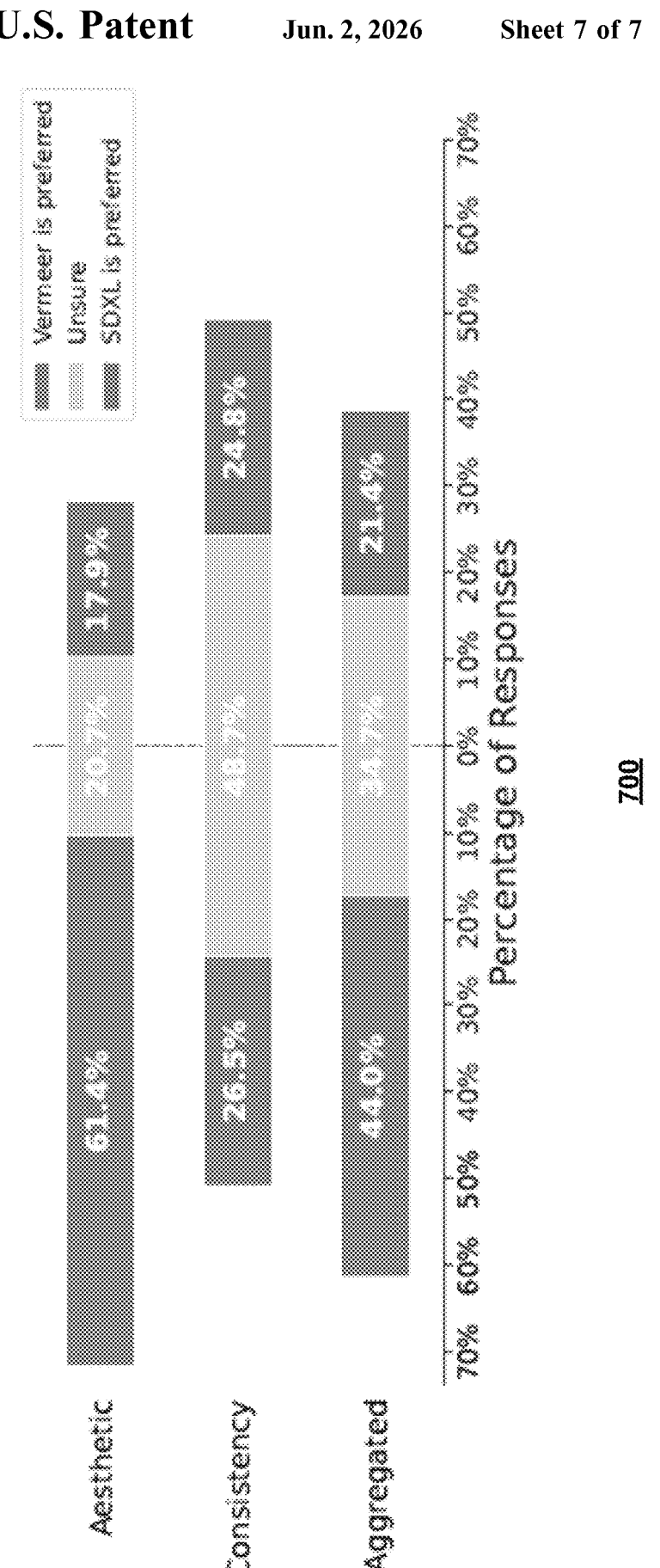
FIG. 7 is an example of the performance of the described techniques.

FIG. 7 is an example 700 of the performance of the described techniques.

In particular, example 700 is a Likert scale plot of human evaluations of images generated using the described techniques (i.e., Vermeer) or with another technique (i.e., SDXL).

The human evaluation included asking human annotators to evaluate generated images by Vermeer and SDXL based on the same prompt. For this, 495 prompts 2 covering a range of skills were collected where 160 are from TIFA v1.0 targeting measuring the faithfulness of a generated image to its text input covering 12 categories (object, attributes, counting, etc.); 200 are sampled from the 1600 Parti Prompts, selecting for both complexity and diversity of challenges; and 150 others are created fresh for, or are sourced from, more recent prompting strategies targeting challenging cases. Annotators were asked to consider either image quality (y-axis Aesthetics), fit to the prompt (y-axis Consistency) or both (y-axis Aggregated), and indicate their preferences using 3-point Liker scale: Vermeer is preferred, Unsure, and SDXL is preferred (the model names were anonymized). The neutral response includes cases that both images are equally good and bad. In the annotation user interface, the annotators are shown a prompt along with two images that are randomly shuffled. 13 human ratings per prompt for both aesthetics and consistency (26 ratings per image) were collected.

Example 700 shows overall, annotators prefer Vermeer 44% of the time, while they select SDXL 21.4% of the time, with relatively fewer Neutral responses (34.7%). Vermeer is clearly preferred for its aesthetics, with a win rate of 61.4%, while the gap in consistency between the two models is small, with a difference in the win rate of just 1.7%. Krippendorff's $\alpha$ for aesthetics and consistency are 0.27 and 0.41, respectively, indicating moderate agreement among annotators.

In this specification, the term "configured" is used in relation to computing systems and environments, as well as computer program components. A computing system or environment is considered "configured" to perform specific operations or actions when it possesses the necessary software, firmware, hardware, or a combination thereof, enabling it to carry out those operations or actions during operation. For instance, configuring a system might involve installing a software library with specific algorithms, updating firmware with new instructions for handling data, or adding a hardware component for enhanced processing capabilities. Similarly, one or more computer programs are "configured" to perform particular operations or actions when they contain instructions that, upon execution by a computing device or hardware, cause the device to perform those intended operations or actions.

The embodiments and functional operations described in this specification can be implemented in various forms, including digital electronic circuitry, software, firmware, computer hardware (encompassing the disclosed structures and their structural equivalents), or any combination thereof. The subject matter can be realized as one or more computer programs, essentially modules of computer program instructions encoded on a tangible non-transitory storage medium for execution by or to control the operation of a computing device or hardware. The storage medium can be a storage device such as a hard drive or solid-state drive (SSD), a storage medium, a random or serial access memory device, or a combination of these. Additionally or alternatively, the program instructions can be encoded on a transmitted signal, such as a machine-generated electrical, optical, or electro-magnetic signal, designed to carry information for transmission to a receiving device or system for execution by a computing device or hardware. Furthermore, implementations may leverage emerging technologies like quantum computing or neuromorphic computing for specific applications, and may be deployed in distributed or cloud-based environments where components reside on different machines or within a cloud infrastructure.

The term "computing device or hardware" refers to the physical components involved in data processing and encompasses all types of devices and machines used for this purpose. Examples include processors or processing units, computers, multiple processors or computers working together, graphics processing units (GPUs), tensor processing units (TPU s), and specialized processing hardware such as field-programmable gate arrays (FPGAs) or application-specific integrated circuits (ASICs). In addition to hardware, a computing device or hardware may also include code that creates an execution environment for computer programs. This code can take the form of processor firmware, a protocol stack, a database management system, an operating system, or a combination of these elements. Embodiments may particularly benefit from utilizing the parallel processing capabilities of GPUs, in a General-Purpose computing on Graphics Processing Units (GPGPU) context, where code specifically designed for GPU execution, often called kernels or shaders, is employed. Similarly, TPUs excel at running optimized tensor operations crucial for many machine learning algorithms. By leveraging these accelerators and their specialized programming models, the system can achieve significant speedups and efficiency gains for tasks involving artificial intelligence and machine learning, particularly in areas such as computer vision, natural language processing, and robotics.

A computer program, also referred to as software, an application, a module, a script, code, or simply a program, can be written in any programming language, including compiled or interpreted languages, and declarative or pro-cedural languages. It can be deployed in various forms, such as a standalone program, a module, a component, a subrou-tine, or any other unit suitable for use within a computing environment. A program may or may not correspond to a single file in a file system and can be stored in various ways. This includes being embedded within a file containing other programs or data (e.g., scripts within a markup language document), residing in a dedicated file, or distributed across multiple coordinated files (e.g., files storing modules, sub-programs, or code segments). A computer program can be executed on a single computer or across multiple computers, whether located at a single site or distributed across multiple sites and interconnected through a data communication network. The specific implementation of the computer programs may involve a combination of traditional program-ming languages and specialized languages or libraries designed for GPGPU programming or TPU utilization, depending on the chosen hardware platform and desired performance characteristics.

In this specification, the term "engine" broadly refers to a software-based system, subsystem, or process designed to perform one or more specific functions. A n engine is typically implemented as one or more software modules or components installed on one or more computers, which can be located at a single site or distributed across multiple locations. In some instances, one or more dedicated com-puters may be used for a particular engine, while in other cases, multiple engines may operate concurrently on the same one or more computers. Examples of engine functions within the context of AI and machine learning could include data pre-processing and cleaning, feature engineering and extraction, model training and optimization, inference and prediction generation, and post-processing of results. The specific design and implementation of engines will depend on the overall architecture and the distribution of computa-tional tasks across various hardware components, including CPUs, GPUs, TPUs, and other specialized processors.

The processes and logic flows described in this specifi-cation can be executed by one or more programmable computers running one or more computer programs to perform functions by operating on input data and generating output. Additionally, graphics processing units (GPUs) and tensor processing units (TPUs) can be utilized to enable concurrent execution of aspects of these processes and logic flows, significantly accelerating performance. This approach offers significant advantages for computationally intensive tasks often found in AI and machine learning applications, such as matrix multiplications, convolutions, and other operations that exhibit a high degree of parallelism. By leveraging the parallel processing capabilities of GPUs and TPUs, significant speedups and efficiency gains compared to relying solely on CPUs can be achieved. Alternatively or in combination with programmable computers and specialized processors, these processes and logic flows can also be implemented using specialized processing hardware, such as field-programmable gate arrays (FPGAs) or application-specific integrated circuits (ASICs), for even greater perfor-mance or energy efficiency in specific use cases.

Computers capable of executing a computer program can be based on general-purpose microprocessors, special-pur-pose microprocessors, or a combination of both. They can also utilize any other type of central processing unit (CPU). Additionally, graphics processing units (GPUs), tensor pro-cessing units (TPUs), and other machine learning accelera-tors can be employed to enhance performance, particularly for tasks involving artificial intelligence and machine learn-ing. These accelerators often work in conjunction with CPUs, handling specialized computations while the CPU manages overall system operations and other tasks. Typi-cally, a CPU receives instructions and data from read-only memory (ROM), random access memory (RA M), or both. The elements of a computer include a CPU for executing instructions and one or more memory devices for storing instructions and data. The specific configuration of process-ing units and memory will depend on factors like the complexity of the AI model, the volume of data being processed, and the desired performance and latency require-ments. Embodiments can be implemented on a wide range of computing platforms, from small, embedded devices with limited resources to large-scale data center systems with high-performance computing capabilities. The system may include storage devices like hard drives, SSDs, or flash memory for persistent data storage.

Computer-readable media suitable for storing computer program instructions and data encompass all forms of non-volatile memory, media, and memory devices. Examples include semiconductor memory devices such as read-only memory (ROM), solid-state drives (SSDs), and flash memory devices; hard disk drives (H DDs); optical media; and optical discs such as CDs, DVDs, and Blu-ray discs. The specific type of computer-readable media used will depend on factors such as the size of the data, access speed requirements, cost considerations, and the desired level of portability or permanence.

To facilitate user interaction, embodiments of the subject matter described in this specification can be implemented on a computing device equipped with a display device, such as a liquid crystal display (LCD) or an organic light-emitting diode (OLED) display, for presenting information to the user. Input can be provided by the user through various means, including a keyboard), touchscreens, voice commands, gesture recognition, or other input modalities depending on the specific device and application. Additional input methods can include acoustic, speech, or tactile input, while feedback to the user can take the form of visual, auditory, or tactile feedback. Furthermore, computers can interact with users by exchanging documents with a user's device or application. This can involve sending web content or data in response to requests or sending and receiving text messages or other forms of messages through mobile devices or messaging platforms. The selection of input and output modalities will depend on the specific application and the desired form of user interaction.

Machine learning models can be implemented and deployed using machine learning frameworks, such as TensorFlow or JAX. These frameworks offer comprehensive tools and libraries that facilitate the development, training, and deployment of machine learning models.

Embodiments of the subject matter described in this specification can be implemented within a computing system comprising one or more components, depending on the specific application and requirements. These may include a back-end component, such as a back-end server or cloud-based infrastructure; an optional middleware component, such as a middleware server or application programming interface (API), to facilitate communication and data exchange; and a front-end component, such as a client device with a user interface, a web browser, or an app, through which a user can interact with the implemented subject matter. For instance, the described functionality could be implemented solely on a client device (e.g., for on-device machine learning) or deployed as a combination of front-end and back-end components for more complex applications. These components, when present, can be interconnected using any form or medium of digital data communication, such as a communication network like a local area network (LAN) or a wide area network (WAN) including the Internet. The specific system architecture and choice of components will depend on factors such as the scale of the application, the need for real-time processing, data security requirements, and the desired user experience.

The computing system can include clients and servers that may be geographically separated and interact through a communication network. The specific type of network, such as a local area network (LAN), a wide area network (WAN), or the Internet, will depend on the reach and scale of the application. The client-server relationship is established through computer programs running on the respective computers and designed to communicate with each other using appropriate protocols. These protocols may include HTTP, TCP/IP, or other specialized protocols depending on the nature of the data being exchanged and the security requirements of the system. In certain embodiments, a server transmits data or instructions to a user's device, such as a computer, smartphone, or tablet, acting as a client. The client device can then process the received information, display results to the user, and potentially send data or feedback back to the server for further processing or storage. This allows for dynamic interactions between the user and the system, enabling a wide range of applications and functionalities.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:

obtaining data specifying a trained initial denoising neural network that is configured to receive an initial denoising input comprising a noisy initial image having an initial resolution and to process the initial denoising input to generate an initial denoising output that defines an estimate of a noise component of the noisy initial image, wherein the initial denoising neural network comprises:

(i) an initial encoder sub-network configured to map the noisy initial image to an initial representation of the noisy initial image having a core resolution;

(ii) a core sub-network that is configured to process the initial representation having the core resolution to generate an updated representation having the core resolution; and (iii) an initial decoder sub-network configured to map the updated representation having the core resolution to the initial denoising output;

obtaining training data, the training data comprising a plurality of training examples, each training example comprising a respective target image having a target resolution that is higher than the initial resolution; and training, using the training data and on a denoising objective, a target denoising neural network, wherein target denoising neural network is configured to receive a target denoising input comprising a noisy target image having the target resolution and to process the target denoising input to generate a target denoising output that defines an estimate of a noise component of the noisy target image, and wherein the target denoising neural network comprises:

(i) a target encoder sub-network that is distinct from the initial encoder sub-network and is configured to map the noisy target image to an initial representation of the noisy target image having the core resolution;

(ii) the core sub-network; and (iii) a target decoder sub-network that is distinct from the initial decoder sub-network and is configured to map an updated representation of the noisy target image having the core resolution and generated by the core-subnetwork to the target denoising output.

2. The method of claim 1, wherein the core resolution is smaller than the initial and target resolutions.

3. The method of claim 1, wherein training the target denoising neural network comprises training the target encoder sub-network and the target decoder sub-network while holding parameters of the core sub-network fixed to corresponding values in the initial denoising neural network.

4. The method of claim 1, wherein the core sub-network comprises a plurality of self-attention layers.

5. The method of claim 1, wherein:

the initial denoising input and the target denoising input each comprise respective conditioning inputs, and each training example further comprises a respective training conditioning input that characterizes one or more properties of the respective target image in the training example.

6. The method of claim 5, wherein the core sub-network comprises one or more conditioning layers that each update an input representation to the conditioning layer conditioned on at least a representation of a corresponding conditioning input.

7. The method of claim 6, wherein the one or more conditioning layers are cross-attention layers.

8. The method of claim 6, wherein the respective conditioning input comprises a respective encoded representation of each of one or more context inputs that comprises one or more embeddings.

9. The method of claim 8, wherein the initial denoising neural network and the target denoising neural network each comprise a context encoder neural network that is configured to process the respective encoded representations of each of the one or more context inputs to generate a representation of the conditioning input.

10. The method of claim 9, wherein training the target denoising neural network comprises training the target encoder sub-network and the target decoder sub-network while holding parameters of the core sub-network and the context encoder neural network fixed to corresponding values in the initial denoising neural network.

11. The method of claim 9, wherein the context encoder neural network comprises an attention pooling sub-network followed by a multi-layer perceptron (MLP).

12. The method of claim 6, wherein the initial denoising input and the target denoising input each comprise respective time inputs specifying a time step that defines a noise level for a corresponding noisy image, and one or more of the conditioning layers are conditioned on a representation of a corresponding time input.

13. The method of claim 12, wherein the initial denoising neural network and the target denoising neural network each comprise a time encoder neural network that is configured to process the respective time input to generate a representation of the respective time input.

14. The method of claim 13, wherein training the target denoising neural network comprises training the target encoder sub-network and the target decoder sub-network while updating parameters of the time encoder neural network neural network starting from corresponding values in the initial denoising neural network.

15. The method claim 1, wherein:

the initial encoder sub-network comprises a downsampling convolutional sub-network configured to map the noisy initial image to a downsampled representation having the core resolution and a convolutional encoder sub-network configured to map the downsampled representation to the initial representation of the noisy initial image having the core resolution.

16. The method of claim 1, wherein:

the initial decoder sub-network comprises a convolutional decoder neural network configured to map the updated representation to a decoded representation having the core resolution and an upsampling convolutional sub-network configured to map the decoded representation having the core resolution to the initial denoising output.

17. The method of claim 1, wherein obtaining data specifying the trained initial denoising neural network comprises:

training the initial denoising neural network using initial training data and on the denoising objective, the initial training data comprising a plurality of initial images having the initial resolution.

18. The method of claim 1, further comprising:

after training the target denoising neural network, performing a reverse diffusion process using the target denoising neural network to generate a new image having the target resolution.

19. The method of claim 18, wherein performing a reverse diffusion process using the target denoising neural network to generate a new image having the target resolution comprises performing the reverse diffusion process conditioned on a new conditioning input.

20. A method performed by one or more computers, the method comprising:

receiving a conditioning input;

initializing a representation of a new image by sampling noise values from a noise distribution; and updating the representation of the new image at each of a plurality of reverse diffusion steps, the updating comprising, at each reverse diffusion step:

processing a denoising input for the reverse diffusion step that comprises the representation of the new image using a denoising neural network conditioned on the conditioning input to generate a denoising output that defines an estimate of a noise component of the representation of the new image, wherein the denoising neural network is the target denoising neural network of claim 1; and updating the representation of the new image using the denoising output; and after updating the representation of the new image at each of the plurality of reverse diffusion steps, generating the new image from the representation of the new image.

21. The method of claim 20, wherein the conditioning input comprises a text sequence, and wherein the method further comprises:

processing the text sequence using each of a plurality of text encoder neural networks to generate a respective encoded representation of the text sequence for each of the text encoder neural networks; and combining the respective encoded representation of the text sequence for each of the text encoder neural networks to generate a combined encoded representation, wherein the denoising input for each reverse diffusion step comprises the combined encoded representation.

22. The method of claim 21, wherein combining the respective encoded representation of the text sequence for each of the text encoder neural networks to generate a combined encoded representation comprises:

concatenating the respective encoded representation of the text sequence for each of the text encoder neural networks to generate a concatenated encoded representation; and processing the concatenated encoded representation using a context encoder neural network to generate the combined encoded representation.

23. The method of claim 21, wherein the plurality of text encoder neural networks have been trained independently of one another.

24. The method of claim 21, wherein the denoising neural network has been trained on first training data comprising a plurality of first training images on a denoising objective.

25. The method of claim 24, wherein, after being trained on the first training data, the denoising neural network has been further trained on second training data that is generated from a mixed set of images that comprises the first training images and a plurality of second training images that have been classified as aesthetic images.

26. The method of claim 25, wherein the second training images are a proper subset of the training images that have been classified as conforming to aesthetic and compositional attributes by an image classification neural network.

27. The method of claim 25, wherein, after being further trained on the second training data, the denoising neural network has been further trained on third training data on a consistency distillation objective.

28. The method of claim 21, wherein generating the new image comprises outputting, as the new image, the representation of the new image after being updated at each of the plurality of reverse diffusion steps.

29. A system comprising one or more computers and one or more storage devices storing instructions that are operable, when executed by the one or more computers, to cause the one or more computers to perform operations, the operations comprising:

obtaining data specifying a trained initial denoising neural network that is configured to receive an initial denoising input comprising a noisy initial image having an initial resolution and to process the initial denoising input to generate an initial denoising output that defines an estimate of a noise component of the noisy initial image, wherein the initial denoising neural network comprises:

(i) an initial encoder sub-network configured to map the noisy initial image to an initial representation of the noisy initial image having a core resolution;

(ii) a core sub-network that is configured to process the initial representation having the core resolution to generate an updated representation having the core resolution; and (iii) an initial decoder sub-network configured to map the updated representation having the core resolution to the initial denoising output;

obtaining training data, the training data comprising a plurality of training examples, each training example comprising a respective target image having a target resolution that is higher than the initial resolution; and training, using the training data and on a denoising objective, a target denoising neural network, wherein target denoising neural network is configured to receive a target denoising input comprising a noisy target image having the target resolution and to process the target denoising input to generate a target denoising output that defines an estimate of a noise component of the noisy target image, and wherein the target denoising neural network comprises:

(i) a target encoder sub-network that is distinct from the initial encoder sub-network and is configured to map the noisy target image to an initial representation of the noisy target image having the core resolution;

(ii) the core sub-network; and (iii) a target decoder sub-network that is distinct from the initial decoder sub-network and is configured to map an updated representation of the noisy target image having the core resolution and generated by the core-subnetwork to the target denoising output.

30. One or more non-transitory computer storage media encoded with instructions that, when executed by one or more computers, cause the one or more computers to perform operations, the operations comprising:

obtaining data specifying a trained initial denoising neural network that is configured to receive an initial denoising input comprising a noisy initial image having an initial resolution and to process the initial denoising input to generate an initial denoising output that defines an estimate of a noise component of the noisy initial image, wherein the initial denoising neural network comprises:

(i) an initial encoder sub-network configured to map the noisy initial image to an initial representation of the noisy initial image having a core resolution;

(ii) a core sub-network that is configured to process the initial representation having the core resolution to generate an updated representation having the core resolution; and (iii) an initial decoder sub-network configured to map the updated representation having the core resolution to the initial denoising output;

obtaining training data, the training data comprising a plurality of training examples, each training example comprising a respective target image having a target resolution that is higher than the initial resolution; and training, using the training data and on a denoising objective, a target denoising neural network, wherein target denoising neural network is configured to receive a target denoising input comprising a noisy target image having the target resolution and to process the target denoising input to generate a target denoising output that defines an estimate of a noise component of the noisy target image, and wherein the target denoising neural network comprises:

(i) a target encoder sub-network that is distinct from the initial encoder sub-network and is configured to map the noisy target image to an initial representation of the noisy target image having the core resolution;

(ii) the core sub-network; and (iii) a target decoder sub-network that is distinct from the initial decoder sub-network and is configured to map an updated representation of the noisy target image having the core resolution and generated by the core-subnetwork to the target denoising output.

* * * * *